United States Patent [19]
Kimura

[11] Patent Number: 5,900,705
[45] Date of Patent: May 4, 1999

[54] MOTOR CONTROL DEVICE FOR A BICYCLE

[75] Inventor: Yoshiki Kimura, Shimonoseki, Japan

[73] Assignee: Shimano, Inc., Osaka, Japan

[21] Appl. No.: 09/047,763

[22] Filed: Mar. 24, 1998

[30] Foreign Application Priority Data

Mar. 31, 1997 [JP] Japan ................................ 9-81145

[51] Int. Cl.⁶ ............................................... B62M 25/08
[52] U.S. Cl. ............................ 318/286; 180/221; 70/233; 318/2
[58] Field of Search ..................... 318/283, 286, 318/293, 466, 468, 2; 180/218, 219, 221; 70/233, 236

[56] References Cited

U.S. PATENT DOCUMENTS

| | | | |
|---|---|---|---|
| 4,044,852 | 8/1977 | Lewis et al. | 180/68.5 |
| 5,007,260 | 4/1991 | Sharp | 70/233 |
| 5,270,681 | 12/1993 | Jack | 340/427 |
| 5,341,892 | 8/1994 | Hirose et al. | 180/220 |
| 5,494,390 | 2/1996 | Gonzales | 411/368 |

FOREIGN PATENT DOCUMENTS

| | | |
|---|---|---|
| 0 537 693 A1 | 4/1993 | European Pat. Off. . |
| 59-153684 | 9/1984 | Japan . |
| 5-262276 | 10/1993 | Japan . |

OTHER PUBLICATIONS

Patent Abstracts of Japan, vol. 18, No. 274, dated 5–24–94, for JP 6–48369.

*Primary Examiner*—Bentsu Ro
*Attorney, Agent, or Firm*—James A. Deland

[57] ABSTRACT

A motor control apparatus for a bicycle having a motor that moves to a plurality of first positions (e.g., gear shifting positions) and to a second position (e.g., an antitheft position) includes a signal providing circuit that provides a first signal for commanding the motor to move from the plurality of first positions toward the second position and that provides a second signal for commanding the motor to move from the second position toward the plurality of first positions. A position indicating circuit is provided for generating a position indicating signal indicating when the motor is in a selected one of the plurality of first positions, and a motor inhibiting circuit is provided for generating a motor inhibiting signal for inhibiting the motor from moving toward the second position in response to the first signal when the position indicating signal indicates the motor is in the selected one of the plurality of first positions.

17 Claims, 21 Drawing Sheets

FIG. 5

| Command | OUT1 | OUT2 | P | Psw | M1 | M2 | Operation |
|---|---|---|---|---|---|---|---|
| Brake | H | H | x | x | H | H | Braking |
| Top→Low | H | L | x | x | H | L | Top→Low rotation |
| Low→Top | L | H | off | off | L | H | Low→Top rotation |
| Low→Top | L | H | off | on | L | L | No rotation |
| Low→Top | L | H | on | x | L | H | Low→Top rotation |
| Off | L | L | x | x | L | L | No rotation |

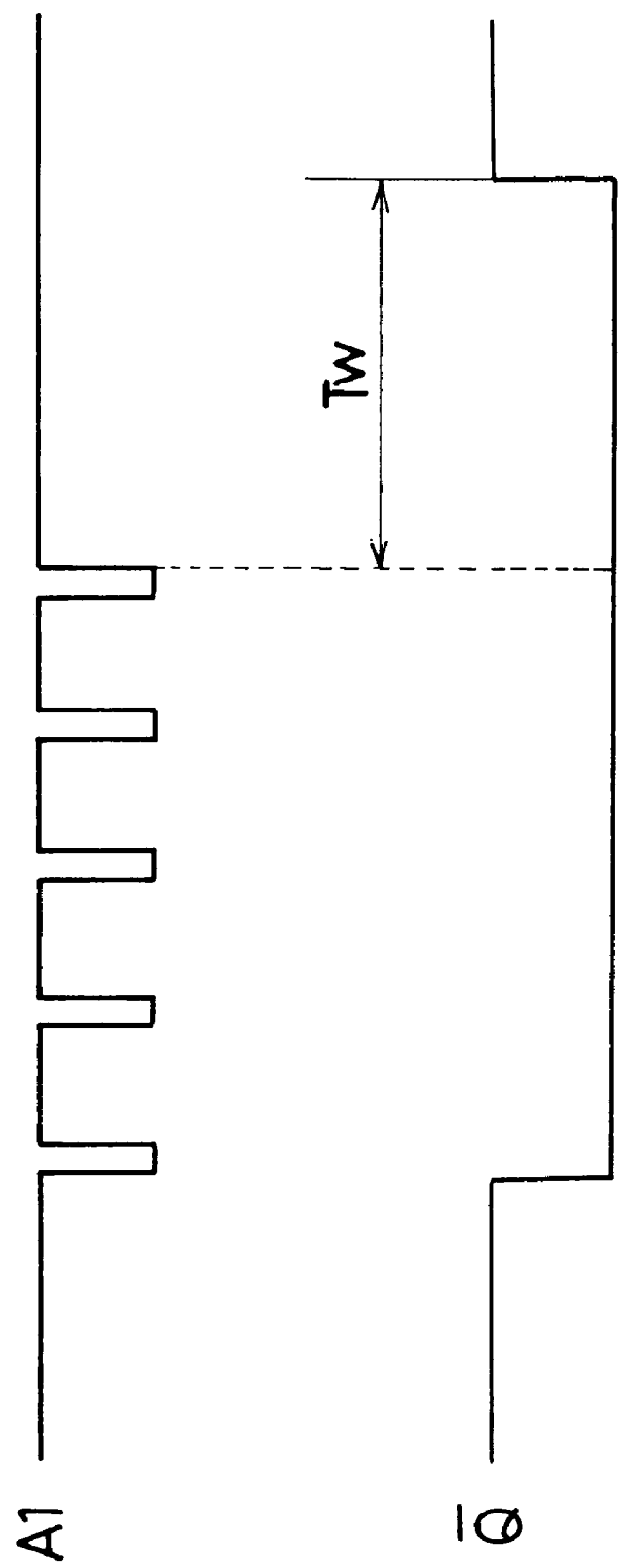

MOTOR CONTROL DEVICE FOR A BICYCLE

BACKGROUND OF THE INVENTION

The present invention is directed to control devices for bicycle transmissions and, more particularly, to a motor control device for controlling a motor used to shift the bicycle transmission.

Bicycles, particularly recreational bicycles referred to as city cruisers, are inexpensive and are easy to ride. Consequently, such bicycles are widely used to commute to work or school. This type of recreational bicycle is sometimes equipped with an internal gear shifter to ride at high speeds over flat terrain or to ride uphill with minimal exertion. Such internal gear shifters commonly use planet gear mechanisms which are compactly housed in the wheel hub.

Because of the usefulness of these bicycles, they are sometimes taken from bike stands or the like in front of train stations and other places. To prevent this type of theft, bicycle locks such as box-shaped locks and horseshoe-shaped locks may be attached to the front or back fork to lock the wheel. However, the simple structure of bicycle locks makes them easy to unlock and remove. Thus, two bicycle locks are sometimes attached to the front and back forks for added protection. For example, a box-shaped lock may be attached to the front fork, and a horseshoe-shaped lock or chain lock may be attached to the back fork. As a result, there is less of a probability of theft because it is more trouble for a potential thief to unlock and take off two locks than just one. However, when two bicycle locks are used, it is a nuisance to lock and unlock them, particularly when a rider is in a hurry. Furthermore, even when two locks are used, bicycles can still be pedaled away and stolen by unlocking or removing the locks.

One idea for preventing the bicycle from being taken is to mount an antitheft device inside of the internal hub transmission to restrict movement of the bicycle when the transmission is set to an antitheft position. If the various operating positions of the bicycle transmission are electrically switched by remote operation from the handlebar, then only a simple operation is required for preventing theft. Such operation is further facilitated if the operating positions are controlled by a motor driven by a microprocessor running appropriate software. If, however, the microprocessor should malfunction due to static electricity, noise, or other such disturbance during running while the operating position is being switched, then there is the danger that the operating position will be erroneously switched from a gear shift position to the antitheft position, and movement of the bicycle will be restricted.

SUMMARY OF THE INVENTION

The present invention is directed to a motor controller for a bicycle transmission which ensures that the transmission can be shifted to the antitheft state only when it is safe to do so. More specifically, the motor controller allows the bicycle transmission to be shifted to the antitheft state only when a mode switch is set to a parking position and/or when the bicycle is not moving.

In one embodiment of the present invention, a motor control apparatus for a bicycle having a motor that moves to a plurality of first positions (e.g., gear shifting positions) and to a second position (e.g., an antitheft position) includes a signal providing circuit that provides a first signal for commanding the motor to move from the plurality of first positions toward the second position and that provides a second signal for commanding the motor to move from the second position toward the plurality of first positions. A position indicating circuit is provided for generating a position indicating signal indicating when the motor is in a selected one of the plurality of first positions, and a motor inhibiting circuit is provided for generating a motor inhibiting signal for inhibiting the motor from moving toward the second position in response to the first signal when the position indicating signal indicates the motor is in the selected one of the plurality of first positions.

In a more specific embodiment, an inhibition release circuit may be provided for generating an inhibition release signal for allowing the motor to move toward the second position in response to the first signal when the position indicating signal indicates the motor is in the selected one of the plurality of first positions. Such a circuit may operate in accordance with a mode switch that indicates the bicycle is in a parking mode, for example.

In yet another embodiment of the present invention, a motion indicating circuit may be provided for generating a motion indicating signal indicating whether the bicycle is in a selected motion state, such as moving below a specified velocity. In this case the inhibition release circuit is coupled to the motion indicating circuit and provides the inhibition release signal when the motion indicating signal indicates the bicycle is in the selected motion state and the second position override signal is output from the second position override circuit.

BRIEF DESCRIPTION OF THE DRAWINGS

FIG. 5 is a table showing the operating states of the motor controller according to the present invention;

FIG. 25 is a timing diagram showing the output of the monostable vibrator shown in FIG. 24.

DETAILED DESCRIPTION OF THE EMBODIMENTS

Figure 1:
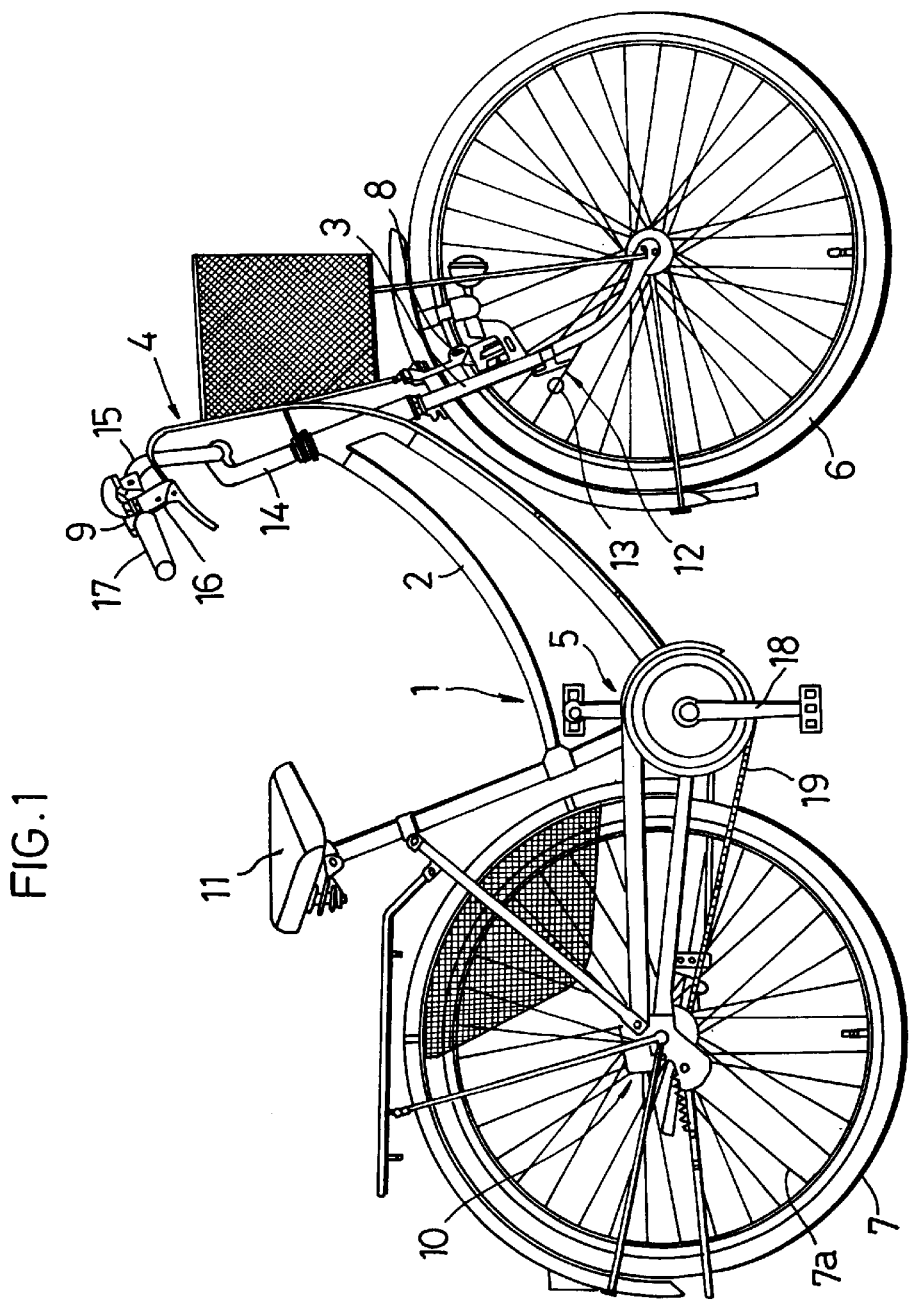
FIG. 1 is a side view of a bicycle in which a particular embodiment of motor controller according to the present invention may be employed.

FIG. 1 is a side view of a bicycle in which a particular embodiment of an antitheft device according to the present invention may be employed. The bicycle includes a frame 1 with a double-loop type of frame unit 2 and a front fork 3; a handle component 4; a drive component 5; a front wheel 6; a rear wheel 7 in which a four-speed internal shifting hub 10 is mounted; front and rear brake devices 8 (only the front brake device is shown in figure); and a shift control element 9 for conveniently operating the internal shifting hub 10. The drive component 5 has a gear crank 18 that is provided to the lower portion (bottom bracket portion) of the frame body 2, a chain 19 that is wrapped around the gear crank 18, and the internal gear hub 10.

Various components, including a saddle 11 and a handle component 4, are attached to the frame 1. A bicycle speed sensor 12 furnished with a bicycle speed sensing lead switch is mounted on the front fork 3. This bicycle speed sensor 12 outputs a bicycle speed signal by detecting a magnet 13 mounted on the front wheel 6. The handle component 4 has a handle stem 14 that is fixed to the upper portion of the front fork 3 and a handlebar 15 that is fixed to the handle stem 14. Brake levers 16 and grips 17 which constitute part of the brake devices 8 are mounted at either end of the handlebar 15. A shift control element 9 is mounted on the right-side brake lever 16.

Figure 2:
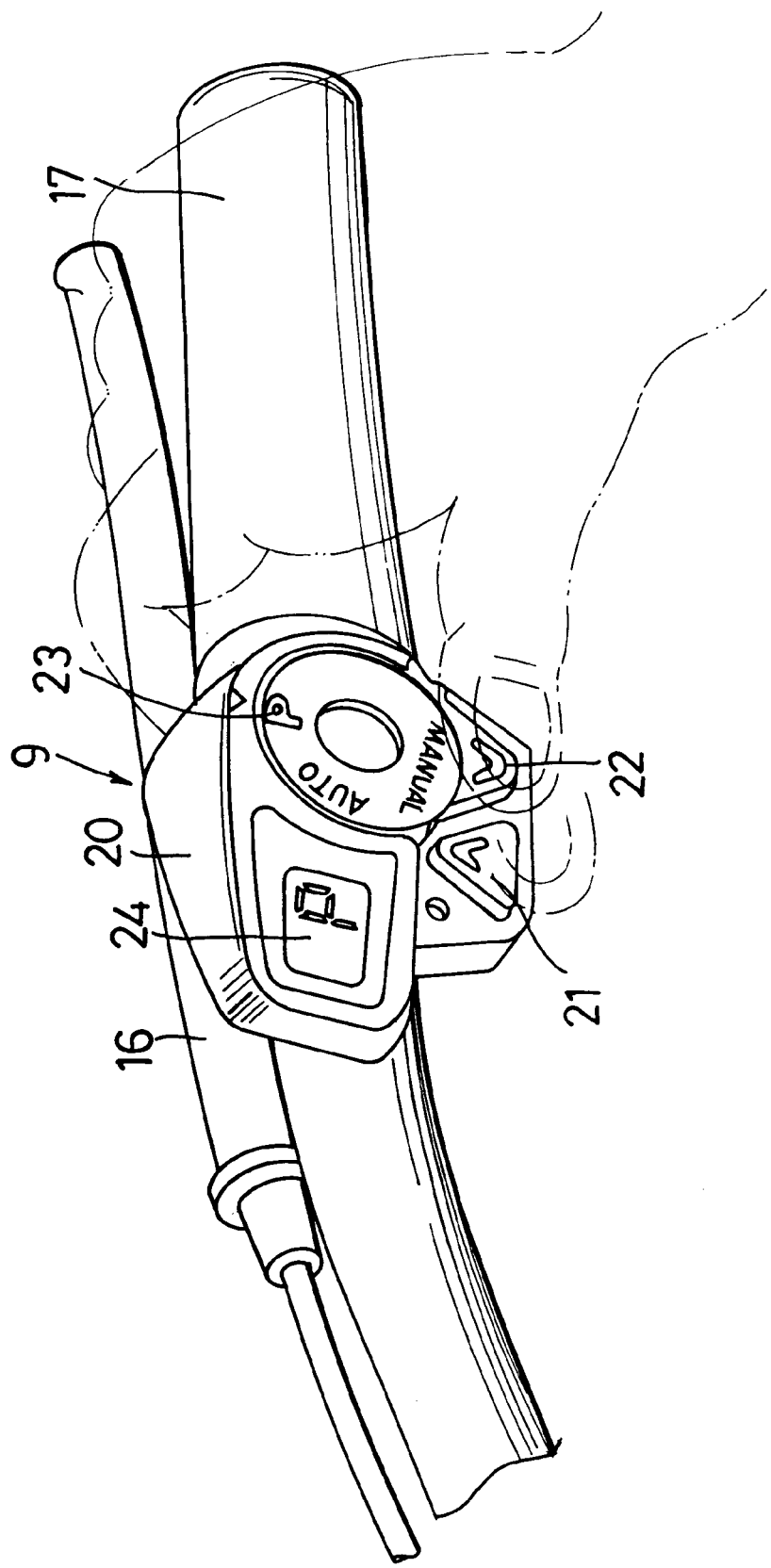
FIG. 2 is an oblique view of a particular embodiment of a handlebar control mechanism used with a motor controller according to the present invention.

As shown in FIG. 2, the shift control element 9 has a control panel 20 formed integrally with the right-side (front-wheel) brake lever 16, two control buttons 21 and 22 disposed next to each other to the left and right on the lower portion of the control panel 20, a control dial 23 disposed above the control buttons 21 and 22, and a liquid-crystal display component 24 disposed to the left of the control dial 23. The current riding speed is displayed on the liquid-crystal display component 24, as is the speed step selected at the time of the shift.

The control buttons 21 and 22 are triangular push buttons. The control button 21 on the left side is used to perform shifts to a higher speed step, while the control button 22 on the right side is used to perform shifts to a lower speed step. The control dial 23 is used to switch among two shifting modes and a parking mode (P), and it has three stationary positions: P, A, and M. Here, the shift mode comprises an automatic shift (A) mode and a manual shift (M) mode. The automatic shift mode is for automatically shifting the internal shifting hub 10 by means of a bicycle speed signal from the bicycle speed sensor 12, and the manual shift mode is for shifting the internal shifting hub 10 through the operation of the control buttons 21 and 22. The parking mode is for locking the internal shifting hub 10 and controlling the rotation of the rear wheel 7.

Figure 3:
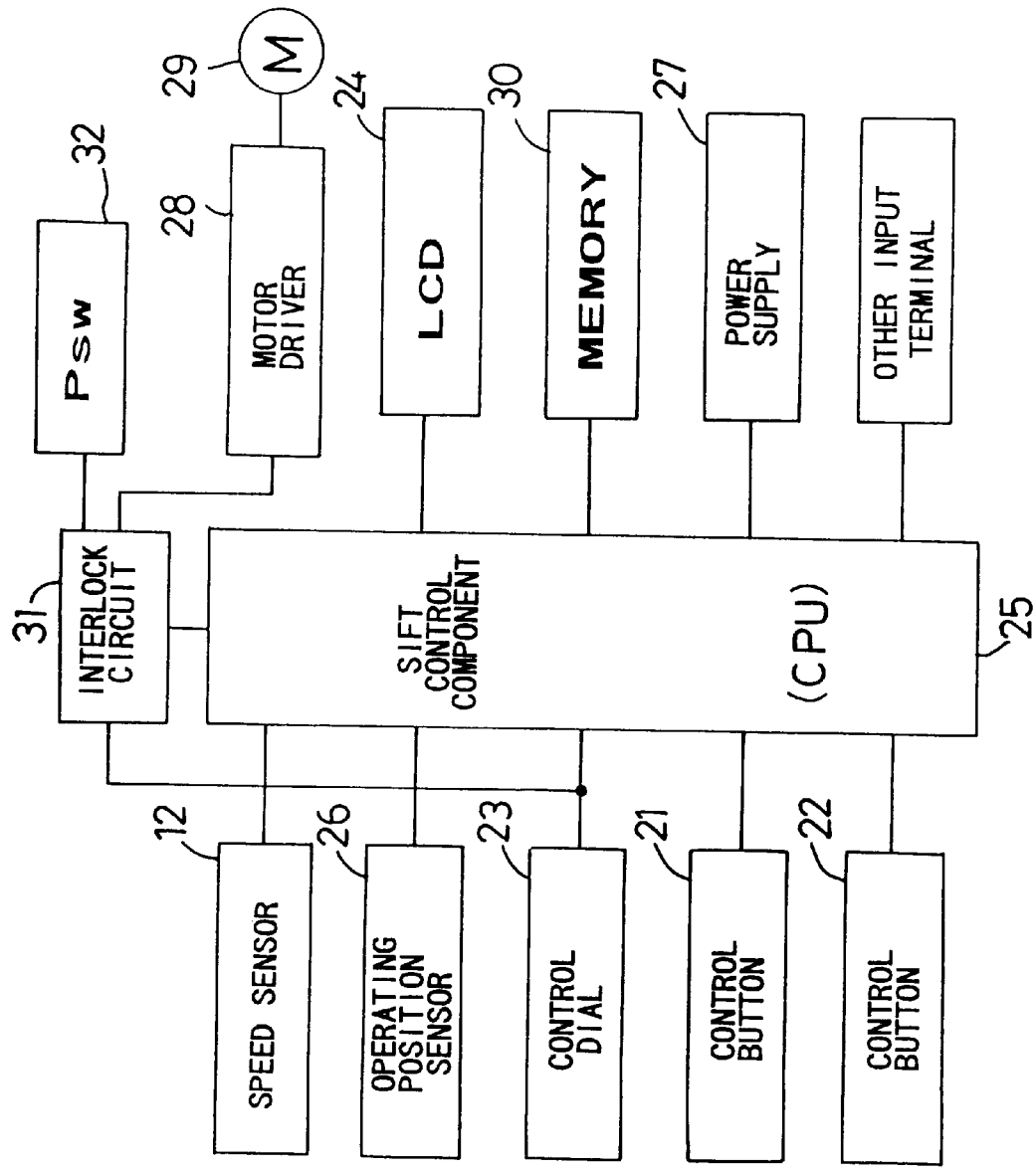
FIG. 3 is a block diagram of a particular embodiment of an electronic control mechanism that may be used with the motor controller according to the present invention.

A shift control component 25 (FIG. 3) that is used to control shifting is housed inside the control panel 20. The shift control component 25 comprises a microcomputer consisting of a CPU, a RAM, a ROM, and an I/O interface. As shown in FIG. 3, the shift control component 25 is connected to the bicycle speed sensor 12, an operating position sensor 26 composed of a potentiometer (for example, a potentiometer that senses the actuation position of the internal shifting hub 10), the control dial 23, and the control buttons 21 and 22. The shift control component 25 is also connected to a power supply 27 (consisting of a battery), an interlock circuit 31, a motor driver 28, the liquid-crystal display component 24, a memory component 30, and another input/output component. A shift motor 29 is connected to the motor driver 28. Various types of data, such as the password (PW) discussed below or the tire diameter, are stored in the memory component 30. The relation between the speed step and the speed during the automatic shift mode is also stored. The shift control component 25 controls the motor 29 according to the various modes, and also controls the display of the liquid-crystal display component 24.

The interlock circuit 31 is provided so that running will not be restricted if the shift control component 25 is erroneously operated as a result of static electricity, noise, or other such disturbance during a switching operation while the bicycle is running. The signal from the control dial 23 is provided to the interlock circuit 31. Also input is the signal from a P switch (labeled Psw in the figure) that detects when the operating position of the internal shifter hub 10 is in the fourth gear position adjacent to the lock position. A signal used for interlocking is communicated from the interlock circuit 31 to the motor driver 28.

Figure 4:
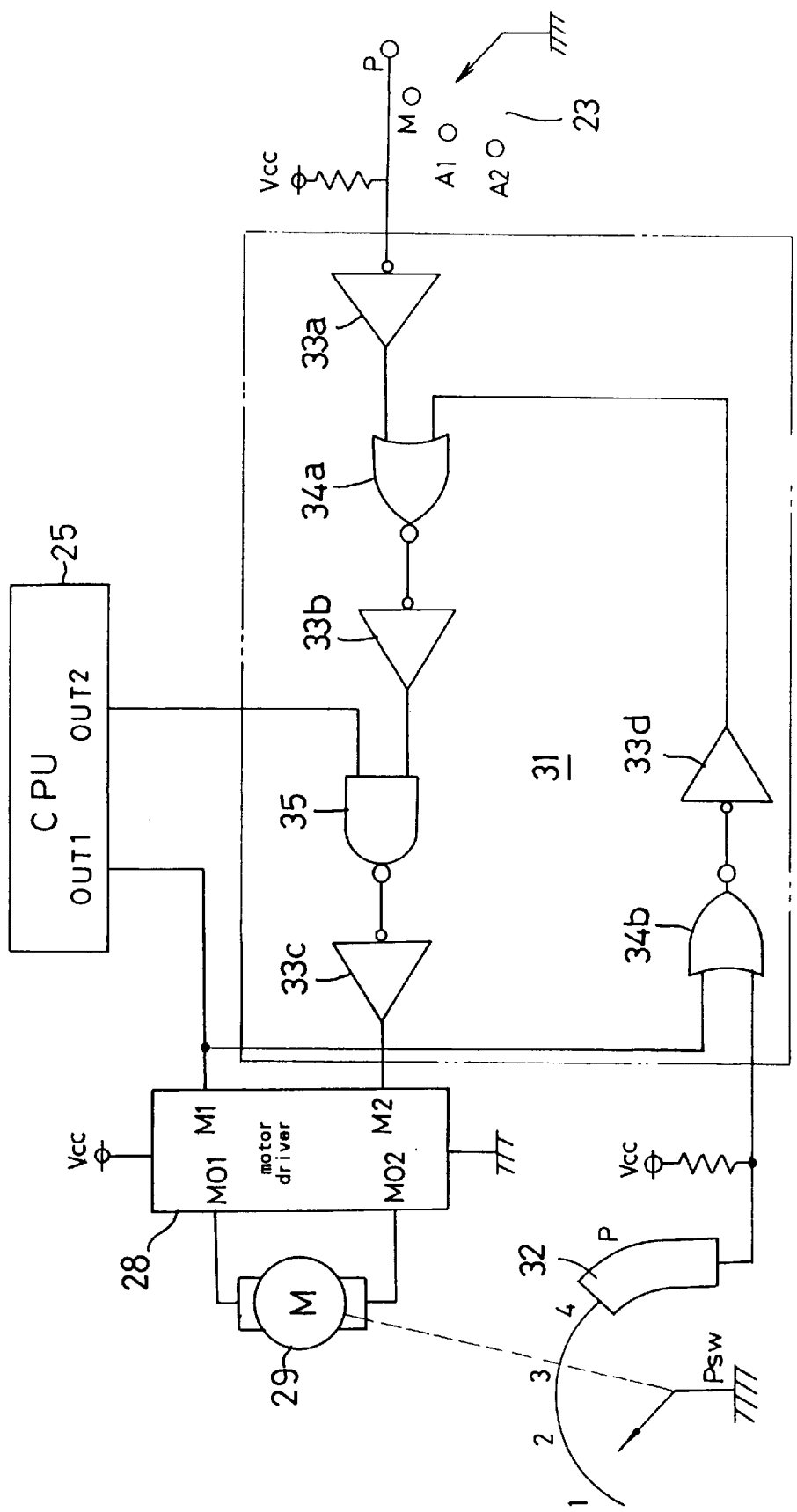
FIG. 4 is a schematic diagram of an electrical circuit used in the motor controller according to the present invention.

As shown in FIG. 4, the interlock circuit 31 consists of logic elements including four inverters 33a to 33d, two NOR gates 34a and 34b, and a NAND gate 35. The control dial 23 is electrically configured such that it shows "L" when in the parking position P. The control dial 23 is connected to the input terminal of the inverter 33a, and the output terminal of inverter 33a is connected to one of the input terminals of the NOR gate 34a. The output terminal of the NOR gate 34a is connected to the input terminal of the inverter 33b, and the output terminal of the inverter 33b is connected to one of the input terminals of the NAND gate 35. The other input terminal of the NAND gate 35 is connected to the output terminal OUT2 of the shift control component 25. The output terminal of the NAND gate 35 is connected to the input terminal M2 of the motor driver 28 via the inverter 33c.

When a shift is made from the low side to the top side (from the first gear side to the fourth gear side), the shift control component 25 outputs a signal "L" from the output terminal OUT1 and a signal "H" from the output terminal OUT2. Conversely, when a shift is made from the top side to the low side, a signal "H" is output from the output terminal OUT1, and a signal "L" is output from the output terminal OUT2. The output terminal OUT1 is connected to the input terminal M1 of the motor driver 28. The P switch 32 outputs an arrival signal "L" when the operating position arrives at the fourth gear position next to the lock position. The P switch 32 is connected to one of the input terminals of the NOR gate 34b. The other input terminal of NOR gate 34b is connected to the output terminal OUT1 of the shift control component 25. The output terminal of the NOR gate 34b is connected to the input terminal of the inverter 33d. The output terminal of this inverter 33d is connected to the other input terminal of the NOR gate 34a. Meanwhile, the motor 29 is connected to the output terminals MO1 and MO2 of the motor driver 28. The output shaft of this motor 29 is output via a reduction mechanism 95 (FIG. 6), and the P switch 32 is connected to the output shaft of this reduction mechanism 95.

FIG. 5 shows the changes in the signals of interlock circuit 31 according to various commands. Here, in the case of a brake command output according to a signal from the operating position sensor 26 upon completion of a shift, "H" signals are output from OUT1 and OUT2. In this case, since an "H" signal is input to the NOR gate 34b, the output thereof is "L" regardless of the signal from the parking switch, the signal is inverted by the inverter 33d, and an "H" signal is input to the NOR gate 34a. Therefore, the output of the NOR gate 34a is also "L" regardless of the output from the control dial 23. Accordingly, an "H" signal is input to both of the input terminals of the NAND gate 35, and the output thereof becomes "L." As a result, an "H" signal is input to each of the input terminals M1 and M2 of the motor driver 28, and the motor 29 is braked.

In the case of a shift from the top side to the low side, an "H" signal is output from OUT1, and a "L" signal is output from OUT2. Here again, since "H" is input to the NOR gate 34b, the output thereof is "L," the signal is inverted by the inverter 33d, and an "H" signal is input to the NOR gate 34a. Therefore, an "H" signal is input to one of the input terminals of the NAND gate 35, an "L" signal is input to the other input terminal of NAND gate 35, and the output thereof becomes "H." Accordingly, "H" is input to the input terminal M1 of the motor driver 28, "L" is input to the input terminal M2, and the motor 29 rotates counterclockwise in FIG. 4.

In the case of a shift from the low side to the top side, an "L" signal is output from OUT1 and an "H" signal is output from OUT2. In this case, since "L" is input to the NOR gate 34b, the output thereof changes depending on the input signal from the P switch 32. When an "H" signal is output from the P switch 32, the output of the NOR gate 34b becomes "L." In this case, since an "H" signal is input to the NOR gate 34a, the output thereof becomes "L," and "H" signals are input to the two input terminals of the NAND gate 35. Therefore, the output thereof becomes "L," an "L" signal is input to the input terminal M1 of the motor driver 28, an "H" signal is input to the input terminal M2, and the motor 29 rotates clockwise in FIG. 4.

When an "L" signal is output from the P switch 32, the output of the NOR gate 34b becomes "H." Thus, since an "L" signal is output from the P switch 32 when a shift is made from the low side to the top side to switch the operating position to the fourth gear position, the output of the NOR gate 34b is "H" only at this time and is "L" at all other times. As a result of the provision of the NOR gate 34b that outputs a signal which changes depending on the signal from the P switch 32, movement to the lock position is prohibited even if the shift control component 25 is accidentally operated during a shift. More specifically, an "L" signal is input to the NOR gate 34a when the NOR gate 34b outputs an "H" signal, and unless an "L" signal is output from the control dial 23, that is, unless the control dial 23 is turned to the parking position, both inputs of the NOR gate 34a will be "L," and the output will by "H." Therefore, the "L" signal is input to one of the input terminals of the NAND gate 35. At this point, since an "H" signal is input to the other input terminal of the NAND gate 35, the output thereof becomes "H," an "L" signal is input both to the input terminal M1 and to the input terminal M2 of the motor driver 28, and the motor 29 does not rotate.

Since an "H" signal is input to one of the input terminals of the NOR gate 34a when the control dial 23 is turned to the parking position, the output thereof becomes "L" regardless of the state of the other input signal. Accordingly, the two input signals of the NAND gate 35 are both "H," the output thereof is "L," an "L" signal is input to the input terminal M1 of the motor driver 28, an "H" signal is input to the input terminal M2, and the motor 29 rotates clockwise in FIG. 4. In other words, when the control dial 23 is turned to the parking position by the NOR gate 34a, prohibition of movement to the lock position is released even if the operating position is the fourth gear position.

When the motor 29 is turned off, "L" signals are output from OUT1 and OUT2. In this case, since an "L" signal is input to the other input terminal of the NAND gate 35, the output thereof is always "H" regardless of the signal input to the other input terminal, "L" signals are input to the input terminals M1 and M2 of the motor driver 28, and the motor 20 does not rotate.

Thus, with the interlock circuit 31, when the shift direction is from the low side to the top side, even if the shift control component 25 is accidentally operated due to static electricity, noise, or other such external disturbance, movement to the lock position will be prohibited by the hardware, so normal riding of the bicycle will not be restricted.

Figure 6:
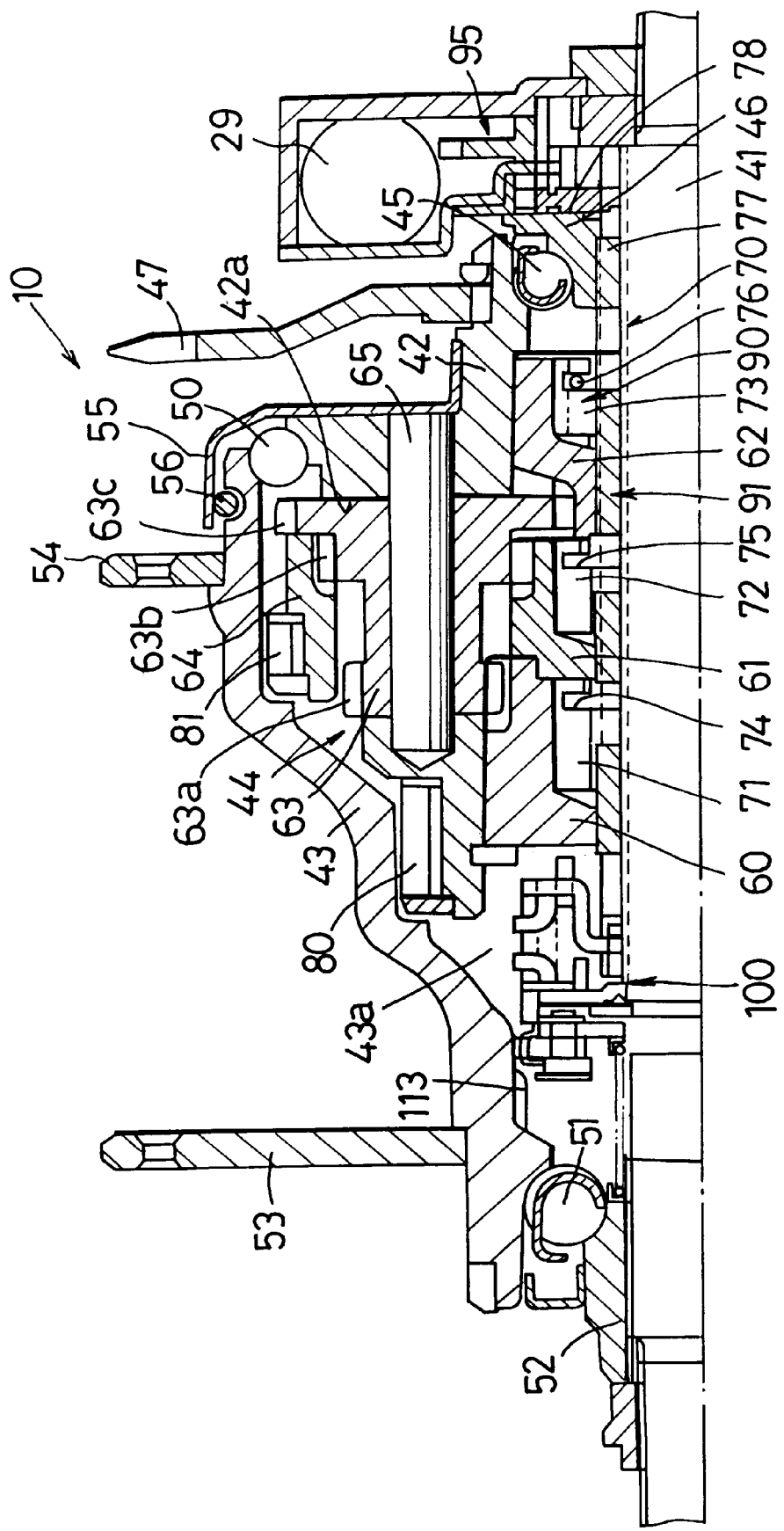
FIG. 6 is a partial cross sectional view of a bicycle hub transmission that incorporates a particular embodiment of an antitheft device according to the present invention.

As shown in FIG. 6, the internal gear hub 10 primarily has a hub axle 41 that is fixed to the rear portion of the bicycle frame 1, a driver 42 that is located around the outer periphery at one end of the hub axle 41, a hub shell 43 that is located around the outer periphery of the hub axle 41 and driver 42, a planet gear mechanism 44 for transmitting motive power between the driver 42 and the hub shell 43, and a sound-generating mechanism 100 for antitheft purposes. The planet gear mechanism 44 is made up of a total of four steps, one direct and three speed-increasing.

The driver 42 is a roughly cylindrical member, one end of which is rotatably supported by the hub axle 41 via balls 45 and a hub cone 46. A hub cog 47 is fixed as an input element around the outer periphery at one end. A notch 42a that expands outward in the radial direction from the space in the center is formed in the driver 42. Three of these notches 42a are formed at roughly equal angles in the circumferential direction.

The hub shell 43 is a cylindrical member having a plurality of steps in the axial direction, and the driver 42 is housed in a housing space 43a around the inner periphery thereof. One side of the hub shell 43 is rotatably supported around the outer periphery of the driver 42 via balls 50, and the other by the hub axle 41 via balls 51 and a hub cone 52. Flanges 53 and 54 for supporting the spokes 7a (FIG. 1) of the rear wheel 7 are fixed around the outer periphery at both ends of the hub shell 43. A cover 55 is fixed to the outer side wall at one side of the driver 42, and the distal end of the cover 55 extends so as to cover the outer peripheral surface at one end of the hub shell 43. A sealing member 56 is positioned between the inner peripheral surface at the distal end of the cover 55, and the outer peripheral surface of the hub shell 43.

The planet gear mechanism 44 is housed in the housing space 43a inside the hub shell 43, and has first, second, and third sun gears 60, 61, and 62, three planet gears 63(a–c) (only one planet gear is shown in the figures) that mesh with these, and a ring gear 64. The sun gears 60 to 62 are lined up in the axial direction around the inner periphery of the driver 42 and the outer periphery of the hub axle 41, and furthermore are allowed to rotate relative to the hub axle 41. The planet gears 63 are rotatably supported via a support pin 65 within the notches 42a in the driver 42. A first gear 63a, a second gear 63b, and a third gear 63c are formed integrally with the planet gears 63. The first gear 63a meshes with the first sun gear 60, the second gear 63b meshes with the second sun gear 61, and the third gear 63c meshes with the third sun gear 62. The ring gear 64 is located on the outer peripheral side of the planet gears 63, and inner teeth are formed around the inner periphery. This ring gear 64 meshes with the second gear 63b of the planet gears 63.

Figure 7:
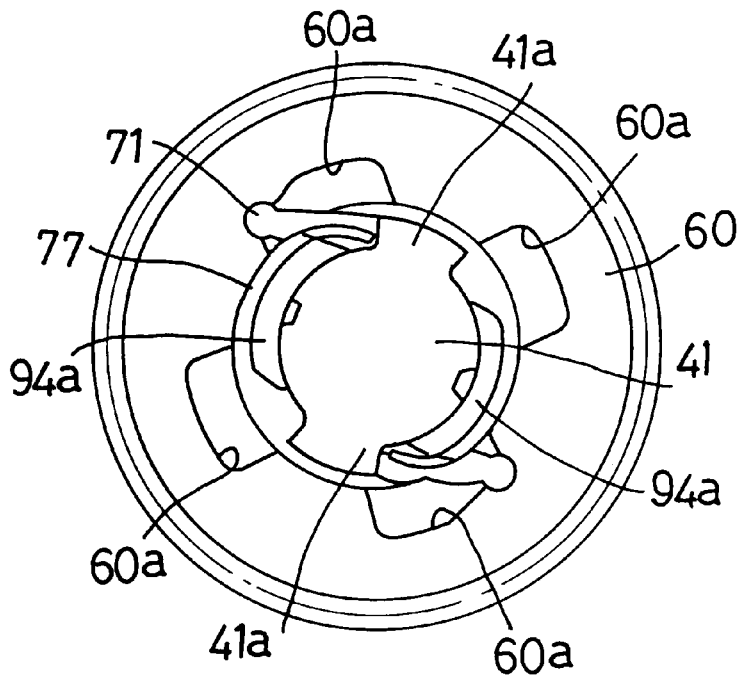
FIG. 7 is a diagram showing the relationship between a first sun gear and drive pawls when the hub transmission shown in FIG. 6 is in a fourth gear.
Figure 8:
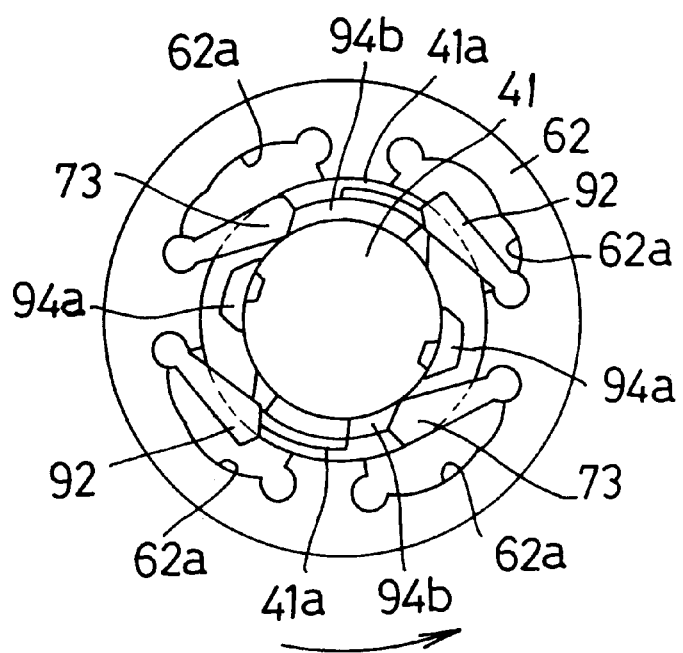
FIG. 8 is a diagram showing the relationship between lock pawls, drive pawls and a third sun gear when the hub transmission shown in FIG. 6 is in the fourth gear.
Figure 9:
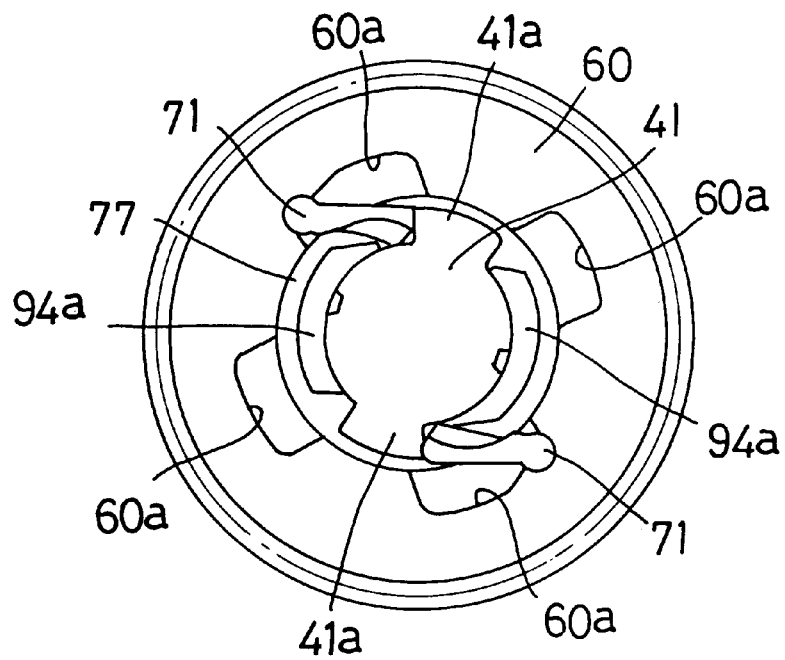
FIG. 9 is a diagram showing the relationship between a first sun gear and drive pawls when the hub transmission shown in FIG. 6 is in a locked state.
Figure 10:
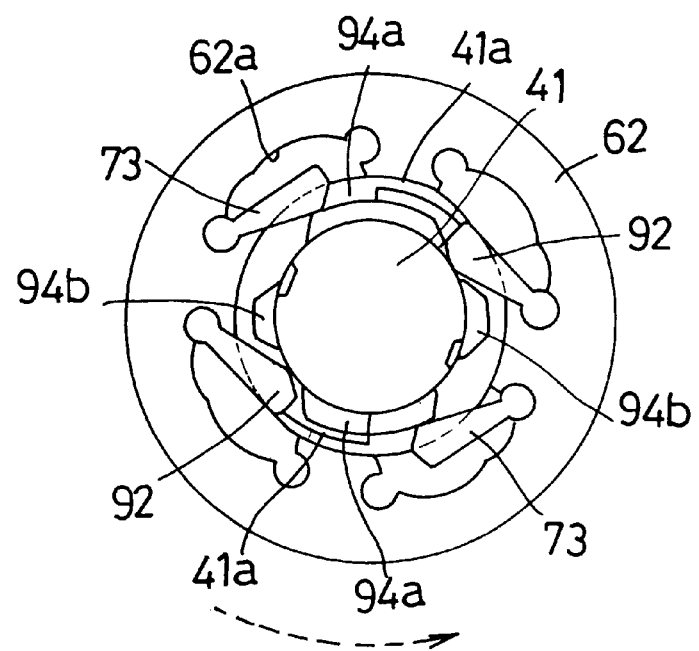
FIG. 10 is a diagram showing the relationship between lock pawls, drive pawls and a third sun gear when the hub transmission shown in FIG. 6 is in the locked state.

As shown in FIGS. 7 to 10, a pair of stopping protrusions 41 a are formed at the locations where the sun gears 60 to 62 are disposed. Four housing spaces 60a to 62a are formed apart from each other in the peripheral direction around the inner periphery of the sun gears 60 to 62. The first sun gear 60 is depicted in FIGS. 7 and 9, whereas the third sun gear 62 is depicted in FIGS. 8 and 10. Between the hub axle 41 and the inner periphery of the sun gears 60 to 62 are positioned a selective clutch mechanism 70 (FIG. 6) for preventing the sun gears 60 to 62 from performing relative rotation in the forward direction or for allowing them to rotate relative to the hub axle 41, a lock mechanism 90 for preventing the third sun gear 62 from performing relative rotation in the opposite direction from the forward direction or for allowing it to perform relative rotation, and an actuation mechanism 91 for actuating the selective clutch mechanism 70 and the lock mechanism 90. These actuation mechanism 91, lock mechanism 90, and sound-generating mechanism 100 constitute an antitheft device.

The selective clutch mechanism 70 has a function whereby it selectively links one of the three sun gears 60 to 62 to the hub axle 41, and a function whereby it does not link any of the sun gears 60 to 62 to the hub axle 41. The selective clutch mechanism 70 has a plurality of drive pawls 71, 72, and 73 that are disposed in the housing spaces 60a to 62a of the sun gears 60 to 62, and the distal ends of which are able to mesh with the stopping protrusions 41a of the hub axle 41, and has annular wire springs 74, 75, and 76 for energizing the distal ends of the drive pawls 71 to 73 toward the hub axle 41. The drive pawls 71 to 73 are swingably supported at their base ends in the pawl housing spaces 60a to 62a where they face each other, and are able to mesh at their distal ends with the stopping protrusions 41a. When the drive pawls 71 to 73 are stopped by the stopping protrusions 41 a of the hub axle 41 and thereby linked to the hub axle 41, the sun gears 60 to 62 are no longer able to rotate in the forward direction (clockwise in FIG. 7) in relation to the hub axle 41 but can perform relative rotation in the opposite direction (counterclockwise in FIG. 7). When the drive pawls are released, relative rotation is possible in both directions.

The lock mechanism 90, as shown in FIG. 8, has a pair of lock pawls 92 which are capable of meshing at their distal ends with the stopping protrusions 41a of the hub axle 41 at the inner surface of the third sun gear 62 and which are positioned in the pawl housing space 62a of the third sun gear 62. The distal ends of the lock pawls 92 are energized toward the hub axle 41 by the wire spring 76 that energizes the drive pawls 73. The lock pawls 92 are swingably supported at their base ends in another pawl housing space 62a opposite from the pawl housing space 62a in which the drive pawl 73 is housed, and they are capable of meshing at their distal ends with the stopping protrusions 41a on the opposite side from the drive pawls 73. When the lock pawls 92 are stopped by the stopping protrusions 41a of the hub axle 41 and thereby linked to the hub axle 41, the third sun gear 62 is no longer able to rotate relatively in the opposite direction from the forward direction (counterclockwise in FIG. 8), but is able to rotate relatively in the forward direction (clockwise in FIG. 8). When the lock pawls are released, relative rotation is possible in both directions.

The actuation mechanism 91 has a sleeve 77. The sleeve 77 is rotatably fitted over the outer periphery of the hub axle 41, and has a plurality of drive cam components 94a and lock cam components 94b at the locations where the drive pawls 71 to 73 and the lock pawls 92 are disposed on the outer periphery. When these drive cam components 94a strike any of the drive pawls 71 to 73, and the lock cam components 94b strike lock pawls 92, the struck pawls are raised, and the linkage between the hub axle 41 and the sun gears 60 to 62 is released by these pawls. An operator 78 is fixed to one end of the sleeve 77, and the sleeve 77 can be rotated by the rotation of the operator 78. The rotation of the sleeve 77 then causes the cam components 94 to selectively actuate the drive pawls 71 to 73 and the lock pawls 92, so that the linkage and locking of the sun gears 60 to 62 with the hub axle 41 are controlled.

As shown in FIG. 6, a reduction mechanism 95 is linked to the operator 78. The reduction mechanism 95 reduces the speed of rotation of the shift motor 29, and transmits rotation to the operator 78. The operating position sensor 26, which is used to fix the sleeve 77 of the internal shifting hub 10 in one of the actuation positions VP (in one of the shift positions V1 to V4 of the speed steps or in the locked position P), is disposed inside the reduction mechanism 95.

With a structure such as this, a large speed-increasing power transmission path with the largest speed increasing ratio is created when the drive pawl 71 strikes a stopping protrusion 41a of the hub axle 41, and the first sun gear 60 is selected; a medium speed-increasing power transmission path with the second-largest speed increasing ratio is created when the second sun gear 61 is selected; and a small speed-increasing power transmission path with the smallest speed increasing ratio is created when the third sun gear 62 is selected. If none of the sun gears has been selected, then a direct-coupled power transmission path is created. Also, when the lock pawls 92 strike the stopping protrusions 41a of the hub axle 41, rotation of the third sun gear 62 is locked in the opposite direction from the forward direction, and when another sun gear (such as the first sun gear 60) is linked with the hub axle 41 by the drive pawls, the internal shifting hub 10 is locked.

A first one-way clutch 80 is provided between the inner peripheral surface of the hub shell 43 and the outer peripheral surface at the other end of the driver 42. A second one-way clutch 81 is provided between the inner peripheral surface of the hub shell 43 and the outer peripheral surface of the ring gear 64. These one-way clutches 80 and 81 are both roller-type, one-way clutches, which reduces noise during idle running when a shift is made, softens the shock when a shift is made, and allows for smoother shifting.

Figure 11:
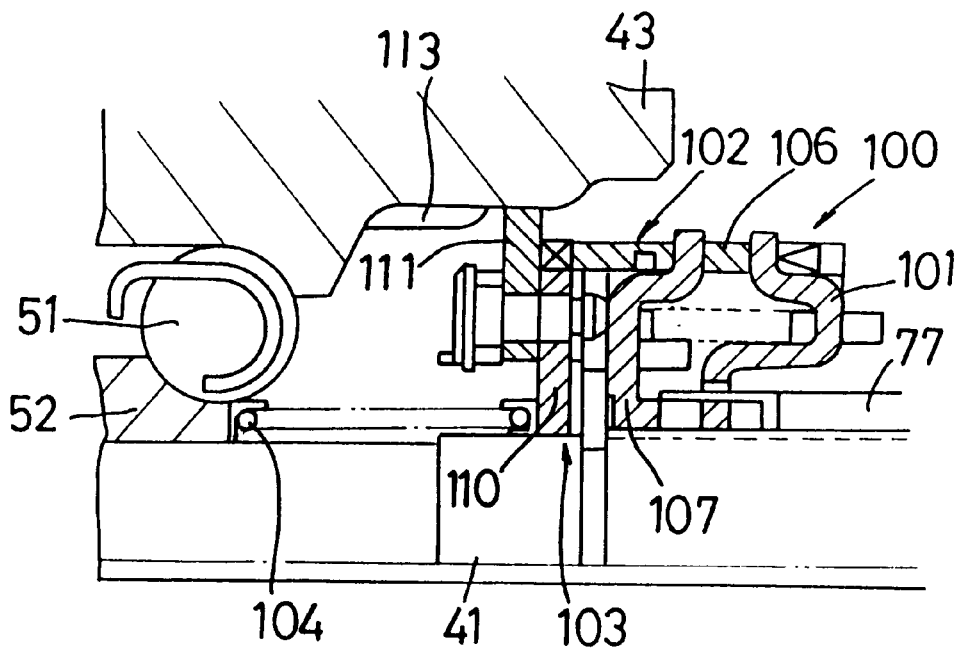
FIG. 11 is a detailed cross-sectional view of the antitheft device shown in FIG. 6 when the bicycle is in motion.
Figure 12:
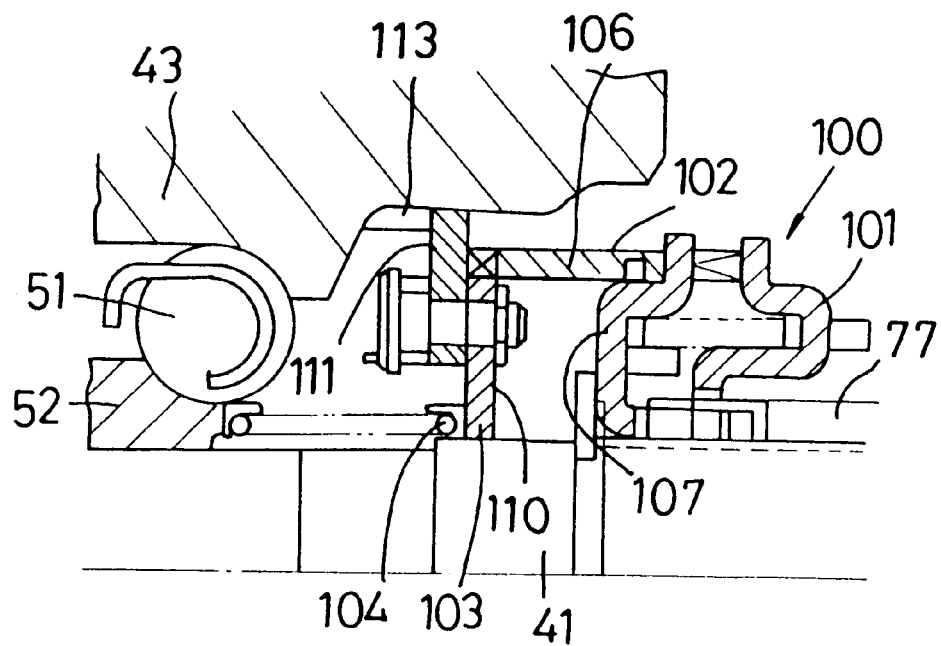
FIG. 12 is a detailed cross-sectional view of the antitheft device shown in FIG. 6 when the bicycle is in a locked state.
Figure 13A:
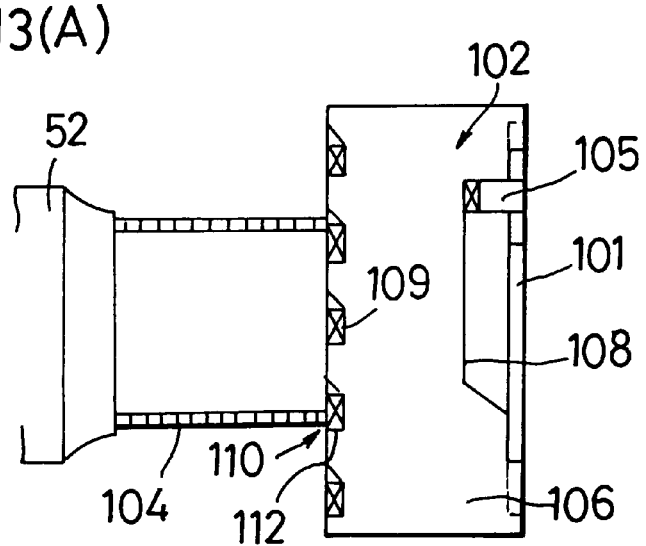
FIGS. 13(a)–13(c) are views showing the operation of the antitheft device of FIG. 6.
Figure 13B:
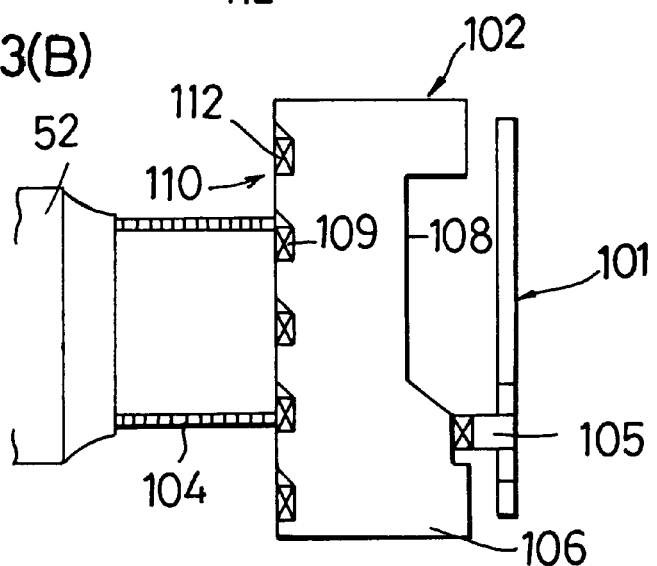
Figure 13C:
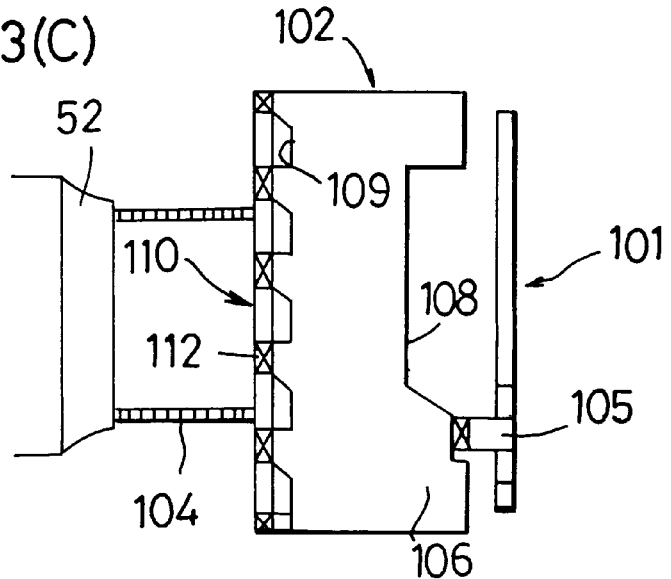

The sound-generating mechanism 100 is provided to the left end (in FIG. 6) of the hub axle 41 within the hub shell 43. As shown in FIGS. 11 to 13, the sound-generating mechanism 100 has a spring washer 101 that rotates integrally with the sleeve 77, a noise-emitting cam 102 positioned on the hub axle 41 such that it is able to move in the axial direction but unable to rotate, a noise-emitting washer 103 that presses against the noise-emitting cam 102, and a noise-emitting spring 104 disposed in a compressed state between the noise-emitting washer 103 and the hub cone 52.

The spring washer 101 is a member that is nonrotatably stopped by the sleeve 77, and it has around its outer periphery an engagement tab 105 that strikes the noise-emitting cam 102. The noise-emitting cam 102 has a cylindrical cam body 106 and a stopping washer 107 that stops the cam body 106 and the hub axle 41 such that they can move in the axial direction but cannot rotate. A cam component 108 that strikes the engagement tab 105 is formed at the right end (in FIG. 13A) of the cam body 106. The cam component 108 is formed such that the cam body 106 is moved axially to the left by the rotation of the sleeve 77 toward the locked position P. A large number of noise-emitting grooves 109 are formed at regular intervals in the circumferential direction at the left end of the cam body 106. The noise-emitting grooves 109 are inclined in the forward direction.

The noise-emitting washer 103 has a disk-shaped washer body 110 and a ratchet pawl 111 that is swingably supported on the washer body 110. Numerous noise-emitting tabs 112 that engage with the noise-emitting grooves 109 are formed around the outer periphery of the washer body 110. The ratchet pawl 111 is able to mesh with ratchet teeth 113 formed in the inner peripheral surface of the hub shell 43 when the hub shell 43 rotates in the forward direction. This sound-generating mechanism 100 emits noise through the vibration of the noise-emitting washer 103 when the sleeve 77 is in the locked position and when the rear wheel 7 rotates in the forward direction.

Figure 14:
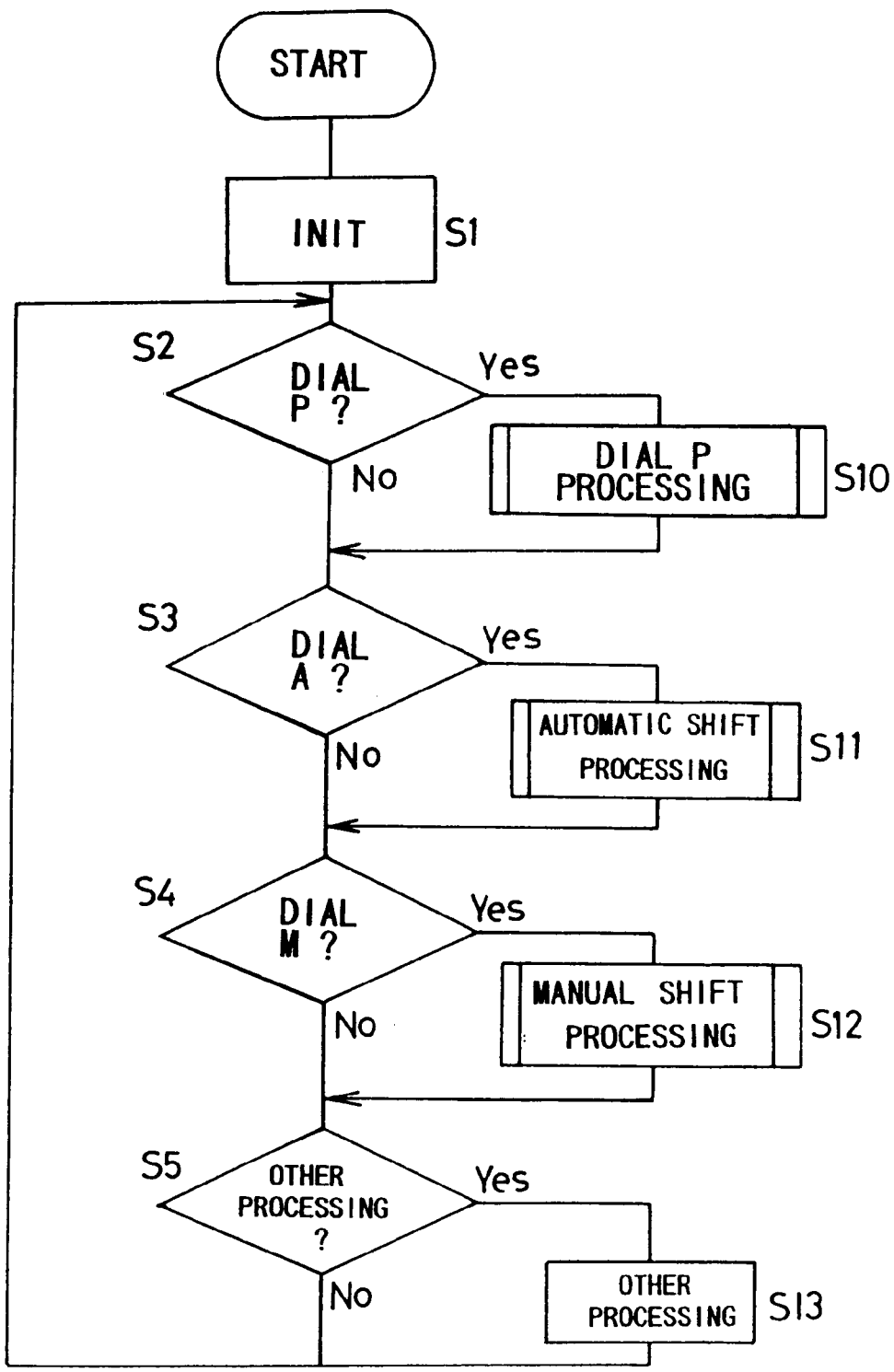
FIG. 14 is a flow chart of a particular embodiment of a main routine for shift processing in a shift control device that incorporates a motor controller and antitheft device according to the present invention.

Shifting and locking are performed by actuating the shift motor 29 through mode selection with the control dial 23 of the shift control element 9, through shift operation with the control buttons 21 and 22, and through rotating the sleeve 77 via the operator 78. FIG. 14 is a flow chart illustrating the actuation and control of the shift control component 25.

When the power is turned on, initialization is performed in step S1. Here, circumference data used for calculating speed is set to a diameter of 26 inches, and the speed step is set to second gear (V2). In step S2, a decision is made as to whether the control dial 23 has been set to the parking mode. In step S3, a decision is made as to whether the control dial 23 has been set to the automatic shift mode. In step S4, a decision is made as to whether the control dial 23 has been set to the manual shift mode. In step S5, a decision is made as to whether some other processing, such as tire diameter input, has been selected.

Figure 15:
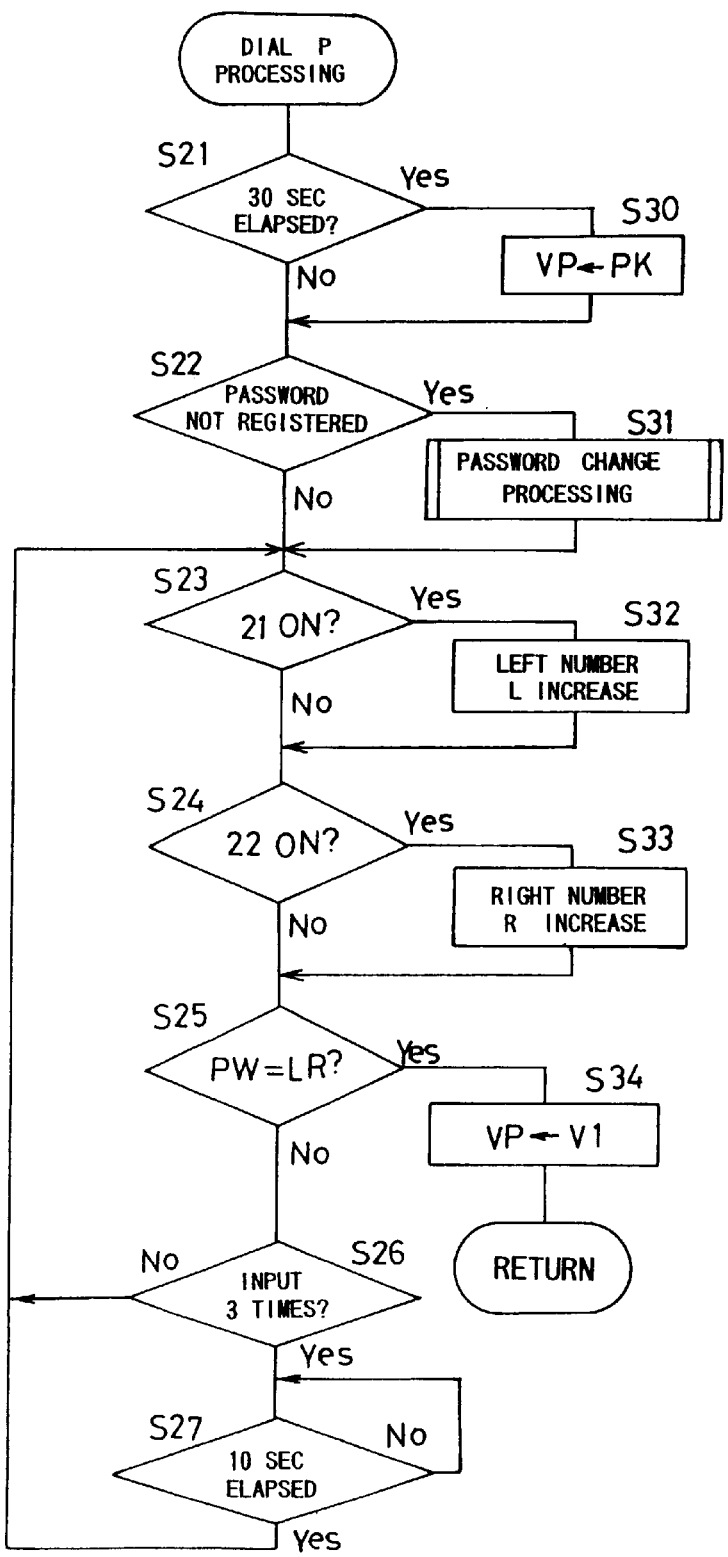
FIG. 15 is a flow chart showing overall password processing in a shift control device that incorporates a motor controller and antitheft device according to the present invention.
Figure 17:
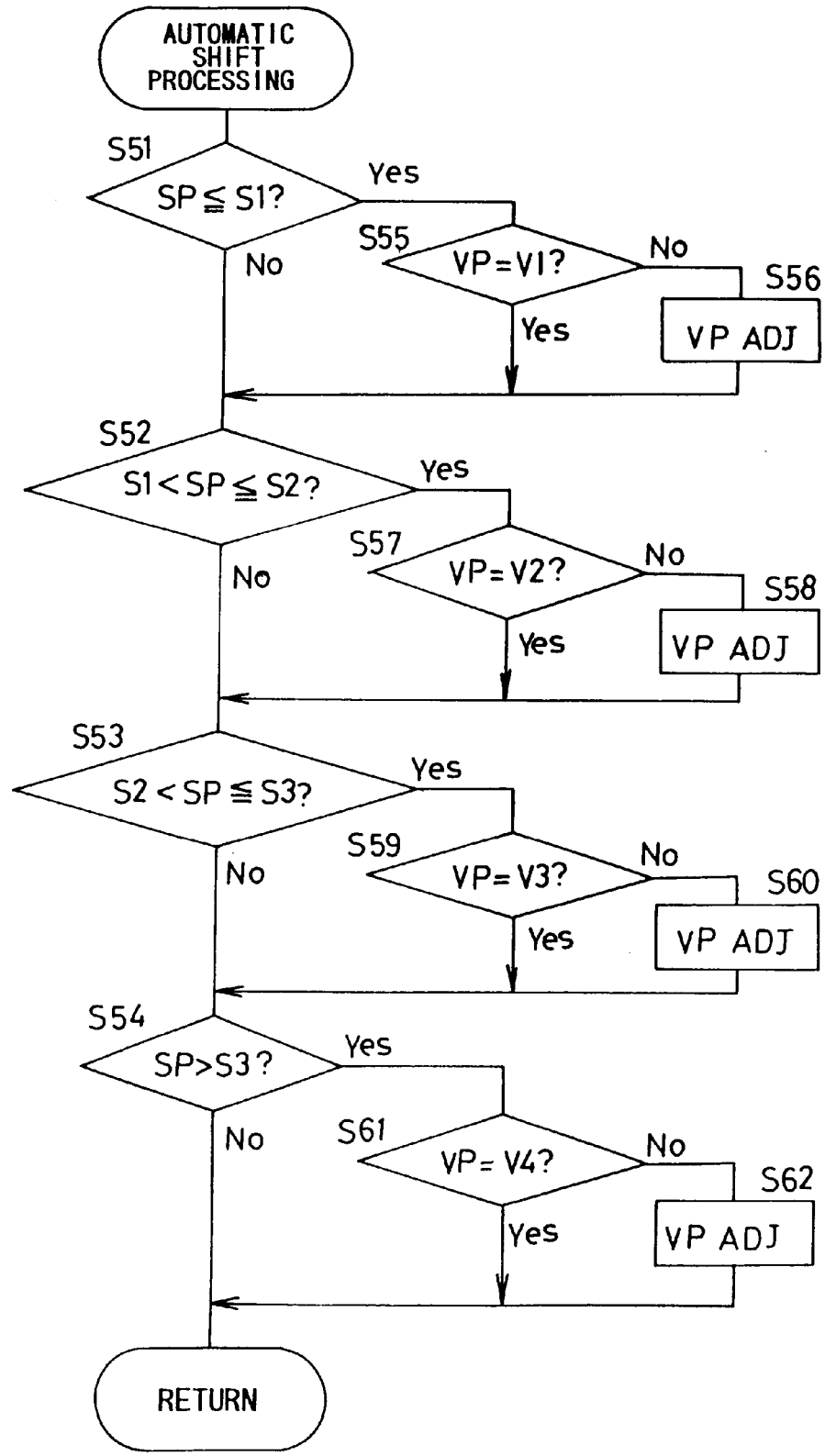
FIG. 17 is a flow chart showing automatic shift processing in a shift control device that incorporates a motor controller and antitheft device according to the present invention.
Figure 18:
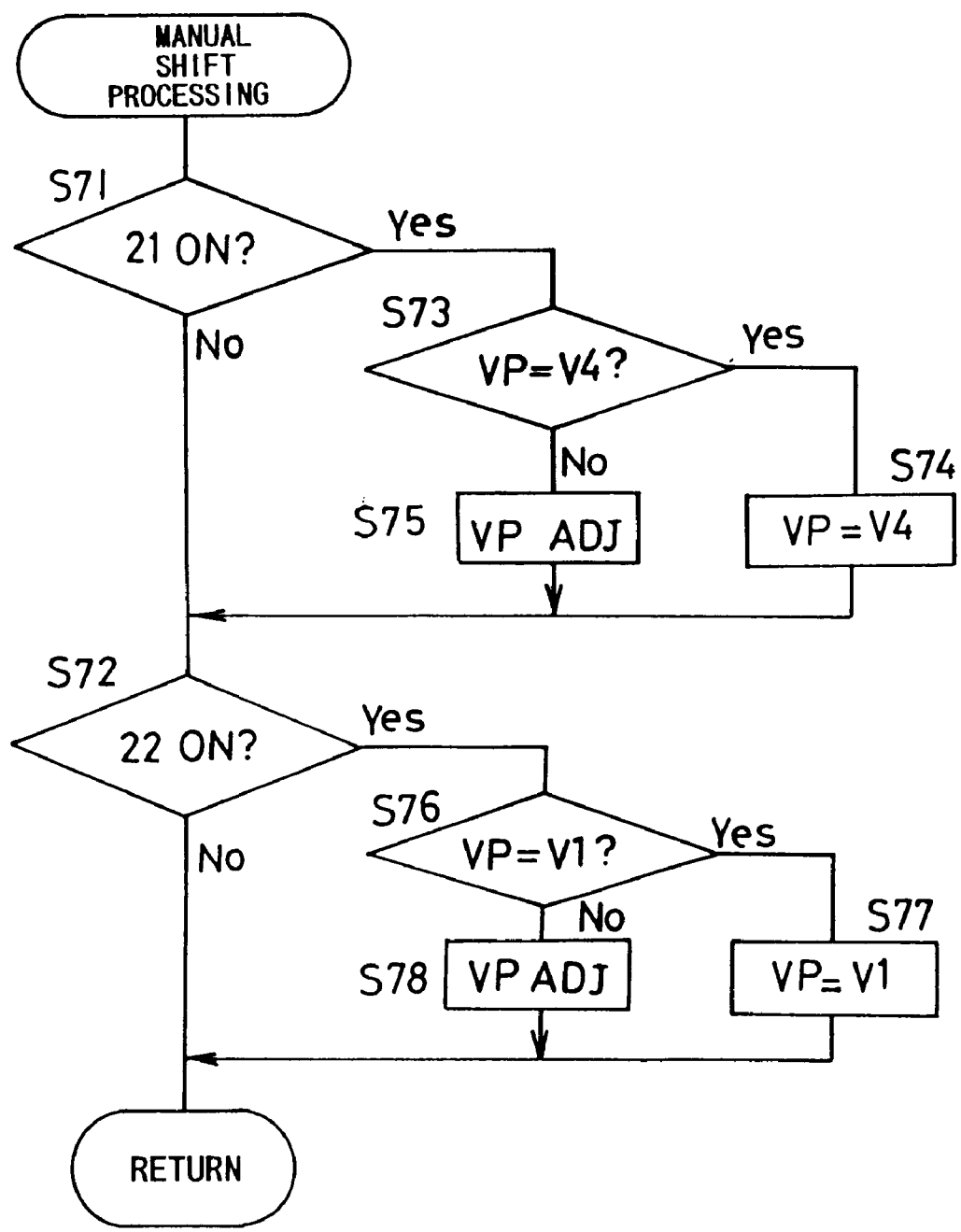
FIG. 18 is a flow chart showing manual shift processing in a shift control device that incorporates a motor controller and antitheft device according to the present invention.

When the control dial 23 is turned to position P and set to the parking mode, the flow goes from step S2 to step S10. In step S10, the dial P processing shown in FIG. 15 is executed. When the control dial 23 is turned to position A and set to the automatic shift mode, the flow goes from step S3 to step S11. In step S11, the automatic shift processing shown in FIG. 17 is executed. When the control dial 23 is turned to position M and set to the manual shift mode, the flow goes from step S4 to step S12. In step S12, the manual shift processing shown in FIG. 18 is executed. When other processing is selected, the flow goes from step S5 to step S13, and the selected processing is executed.

With the dial P processing in step S10, a decision is made as to whether 30 seconds has elapsed since the dial was turned to position P in step S21 in FIG. 15. In step S22, a decision is made as to whether the password PW has been registered. This decision is made on the basis of whether the password PW has already been stored in the memory component 30. If the password has already been registered, the flow moves on to step S23.

In step S23 a decision is made as to whether the left control button 21 has been operated. The purpose of operating the control buttons 21 and 22 here is to input the password for unlocking the locked internal shifting hub 10. In step S24 a decision is made as to whether the right control button 22 has been operated. In step S25 a decision is made as to whether the password LR input by operation of the two control buttons 21 and 22 matches the registered password PW. If there is no match, the flow moves on to step S26. In step S26 a decision is made as to whether the password still does not match after it has been input three times. If it has yet to be input three times, the flow returns to step S23, and the re-inputting of the password is permitted. If the password does not match the registered password PW after three inputs, the flow moves on to step S27. In step S27, the system waits for 10 minutes to pass, and when 10 minutes have elapsed, the flow returns to step S23, and the re-inputting of the password is permitted.

Once 30 seconds have elapsed since the dial was turned to the P position, the flow moves from step S21 to step S30. In step S30, the shift motor 29 is driven by the motor driver 28, and the actuation position VP is set to the locked position P. As a result, the sleeve 77 is rotated via the operator 78, the drive pawl 71 is raised as shown in FIGS. 9 and 10 so that the first sun gear 60 and the hub axle 41 are locked in just the forward direction, and the lock pawls 92 are raised so that the third sun gear 62 and the hub axle 41 are nonrotatably locked in the opposite direction from the forward direction. When the two sun gears 60 and 62 are thus locked, if an attempt is made to rotate the driver 42 by rotating the crank gear 18, the system will try to make the largest upshift since the first sun gear 60 is locked in the forward direction, but since the third sun gear 62 cannot turn backward, the planet gear mechanism 44 is locked and cannot move. Accordingly, the bicycle cannot be pedaled away, making its theft more difficult.

If the bicycle is pushed by hand at this point, the one-way clutch 80 will allow it to move forward even if the planet gear mechanism 44 is locked. If, however, the sleeve 77 is rotated to the locked position P, the cam body 106 of the sound-generating mechanism 100 will be pressed by the engagement tab 105 of the spring washer 101 that rotates along with the sleeve 77, and will move from the position indicated by (A) in Figured 13 to the positions indicated by (B) and (C) in FIG. 13 (that is, will move to the left in the axial direction). As a result, the ratchet pawl 111 of the noise-emitting washer 103 meshes with the ratchet teeth 113 of the hub shell 43, and rotates integrally with the hub shell 43 only in the forward direction. At this point, the noise-emitting tabs 112 of the noise-emitting washer 103 go in and out of the noise-emitting grooves 109 of the noise-emitting cam 102, creating a loud impact sound. Consequently, a loud noise is produced when the bicycle is pushed by hand in a locked state, and this also deters theft.

Figure 16:
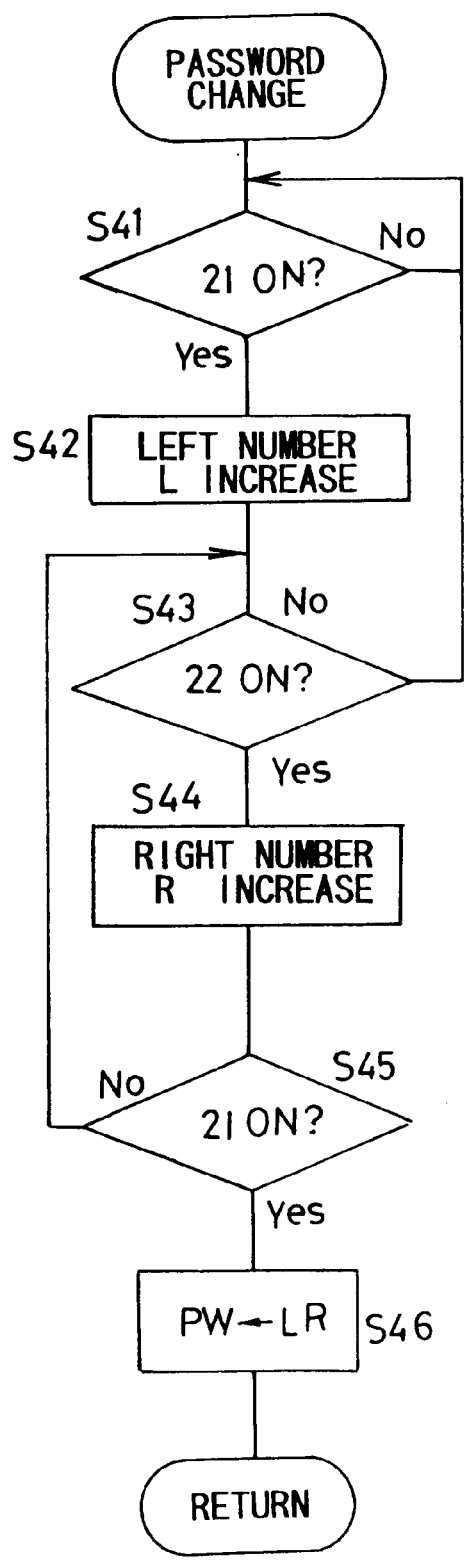
FIG. 16 is a flow chart showing password registration processing in a shift control device that incorporates a motor controller and antitheft device according to the present invention.

If the password PW has not been registered, the flow moves from step S22 to step S31. In step S31, the code registration processing illustrated in FIG. 16 is executed. Here, a decision is made as to whether the control button 21 was operated in step S41 in FIG. 16. If the control button 21 was operated, the flow moves to step S42, and the left number L (a 1-digit number) is increased by one. In step S43 a decision is made as to whether the control button 22 was operated. The flow returns to step S41 until the control button 22 is pushed, and the left number L is increased by one. When the control button 22 is operated, the flow moves to step S44, and the right number R (a 1-digit number) is increased by one. In step S45 a decision is made as to whether the control button 21 was operated again. The flow returns to step S43 until the control button 21 is operated, and the right number R is increased by one. When the control button 21 is operated, the flow moves to step S46, and the input number LR is stored as the password PW in the memory component 30. A password PW is thus registered after being selected from among 100 two-digit numbers LR ranging from "00" to "99."

In step S23, if it is decided that the control button 21 was operated during unlocking, the flow moves on to step S32. In step S32 the left number L is increased by one, just as when the password was registered. If it is decided that the control button 22 was operated, the flow moves from step S24 to step S33. In step S33, the right number R is increased by one, just as when the password was registered. If the input number LR matches the password PW in step S25, the flow moves to step S34, and the actuation position VP is set to first gear V1. As a result, the sleeve 77 is rotated by the shift motor 29 and positioned at the first gear V1, the lock pawl 92 of the third sun gear 62 comes out, and all of the drive pawls 71 to 73 come out. This means that all of the sun gears 60 to 62 are free to rotate with respect to the hub axle 41. As a result, when the bicycle is pedaled, the rotation of the driver 42 is transmitted directly to the hub shell 43 via the first one-way clutch 80.

With the automatic shift processing of step S11, the actuation position VP is set to a speed step corresponding to the bicycle speed SP. When the position is different from this, shifts are made one gear at a time toward this. Here, in step S51 in FIG. 17, a decision is made as to whether the bicycle speed SP is at or below the speed S1 on the basis of the speed signal from the bicycle speed sensor 12. In step S52 a decision is made as to whether the bicycle speed SP is over the speed S1 and at or below the speed S2. In step S53 a decision is made as to whether the bicycle speed SP is over the speed S2 and at or below the speed S3. In step S54 a decision is made as to whether the bicycle speed SP is over the speed S3.

When the bicycle speed SP is low (at or below the speed S1), the flow moves from step S51 to step S55. In step S55 a decision is made as to whether the current actuation position VP is first gear V1. If the actuation position VP is not first gear V1, the flow moves on to step S56, and the actuation position VP is adjusted to first gear V1 one speed step at a time. If the bicycle speed SP is medium low (over the speed S1 and at or below the speed S2), the flow moves from step S52 to step S57. In step S57 a decision is made as to whether the current actuation position VP is second gear V2. If the actuation position VP is not second gear V2, the flow moves on to step S58, and the actuation position VP is adjusted to second gear V2 one speed step at a time. If the bicycle speed SP is medium high (over the speed S2 and at or below the speed S3), the flow moves from step S53 to step S59. In step S59 a decision is made as to whether the current actuation position VP is third gear V3. If the actuation position VP is not third gear V3, the flow moves on to step S60, and the actuation position VP is adjusted to third gear V3 one speed step at a time. If the bicycle speed SP is high (over the speed S3), the flow moves from step S54 to step S61. In step S61 a decision is made as to whether the current actuation position VP is fourth gear V4. If the actuation position VP is not fourth gear V4, the flow moves on to step S62, and the actuation position VP is adjusted to fourth gear V4 one speed step at a time.

Here, when the first sun gear 60 and the hub axle 41 are linked by the shift motor 29, the bicycle is in fourth gear V4, the rotation input from the chain wheel to the driver 42 is increased by the largest gear ratio determined by the number of teeth on the first sun gear 60, the first gear 63a and second gear 63b of the planet gears 63, and the ring gear 64, and this rotation is transmitted to the hub shell 43 via the second one-way clutch 81. When the second sun gear 61 is selected and linked to the hub axle 41, the bicycle is in third gear V3, the rotation of the driver 42 is increased by a medium (the second largest) gear ratio determined by the number of teeth on the second sun gear 61, the second gear 63b of the planet gears 63, and the ring gear 64, and this rotation is transmitted to the hub shell 43 via the second one-way clutch 81. When the third sun gear 62 is selected and linked to the hub axle 41, the bicycle is in second gear V2, the rotation of the driver 42 is increased by the smallest gear ratio determined by the number of teeth on the third sun gear 62, the second gear 63b and third gear 63c of the planet gears 63, and the ring gear 64, and this rotation is transmitted to the hub shell 43 via the second one-way clutch 81. If none of the sun gears 60 through 62 is selected, first gear V1 is engaged, and the rotation of the driver 42 is transmitted directly to the hub shell 43, as above. Unselected sun gears perform relative rotation in the opposite direction from the forward direction with respect to the hub axle 41. When any one of the sun gears is selected and speed is stepped up by the planet gear mechanism 44, the driver 42 and the hub shell 43 perform relative rotation in the direction in which meshing with the first one-way clutch 80 is released.

With the manual shift processing of step S12, gear shifts are made one at a time by operation of the control buttons 21 and 22. In step S71 in FIG. 18 a decision is made as to whether the control button 21 was operated. In step S72 a decision is made as to whether the control button 22 was operated. When the control button 21 is operated, the flow moves from step S71 to step S73. In step S73 a decision is made as to whether the current actuation position VP is fourth gear V4. If the current actuation position VP is fourth gear V4, the flow moves on to step S74, and fourth gear V4 is maintained without a shift being made. If the current actuation position VP is not fourth gear V4, then the flow moves to step S75, and the actuation position VP is moved one speed step higher. When the control button 22 is operated, the flow moves from step S71 to step S76. In step S76 a decision is made as to whether current actuation position VP is first gear V1. If the current actuation position VP is first gear V1, the flow moves on to step S77, and first gear V1 is maintained without a shift being made. If the current actuation position VP is not first gear V1, the flow moves to step S78, and the actuation position VP is moved one speed step lower. During these shifts, the sensing results from the operating position sensor 26 are compared with the positional data for each actuation position stored ahead of time in the memory component 30, the results of which are used to perform positioning control of the shift motor 29.

In this automatic and manual shifting, even if the shift control component 25 is erroneously operated due to static electricity, noise, or other such disturbance during a shift from the low side (first gear side) to the top side (fourth gear side), the operating position will not move from the fourth gear position V4 to the lock position P because the interlock circuit 31 is located between the shift control component 25 and the motor driver 28. Accordingly, there will be no restriction on the normal operation of the transmission by the lock mechanism while the bicycle is in motion.

According to this embodiment, entering the parking mode with the aid of the control dial 23 allows this mode to be maintained as long as the entered password does not match the registered password, and hence impedes the unlocking of the antitheft device containing the lock mechanism 90. In addition, entering the parking mode with the aid of the control dial 23 allows the planetary gear mechanism 44 to be locked by the lock mechanism 90 and the sound-generating mechanism 100 to produce a sound, making it impossible for an unauthorized person to pedal the bicycle away and generating a sound when the bicycle is pushed. This arrangement can minimize bicycle theft.

In the above-described embodiment, a lock mechanism 90 was provided between a hub axle 41 and a sun gear 62 that performed relative rotation, and a sound-generating mechanism 100 was separately provided between the hub axle 41 and the hub shell 43 to prevent theft. It is also possible, however, to position an antitheft device 85 endowed with sound-generating and locking functions between the hub axle 41 and the hub shell 43, that is, to provide the device to a running component that performs relative rotation as shown in FIG. 19.

Figure 19:
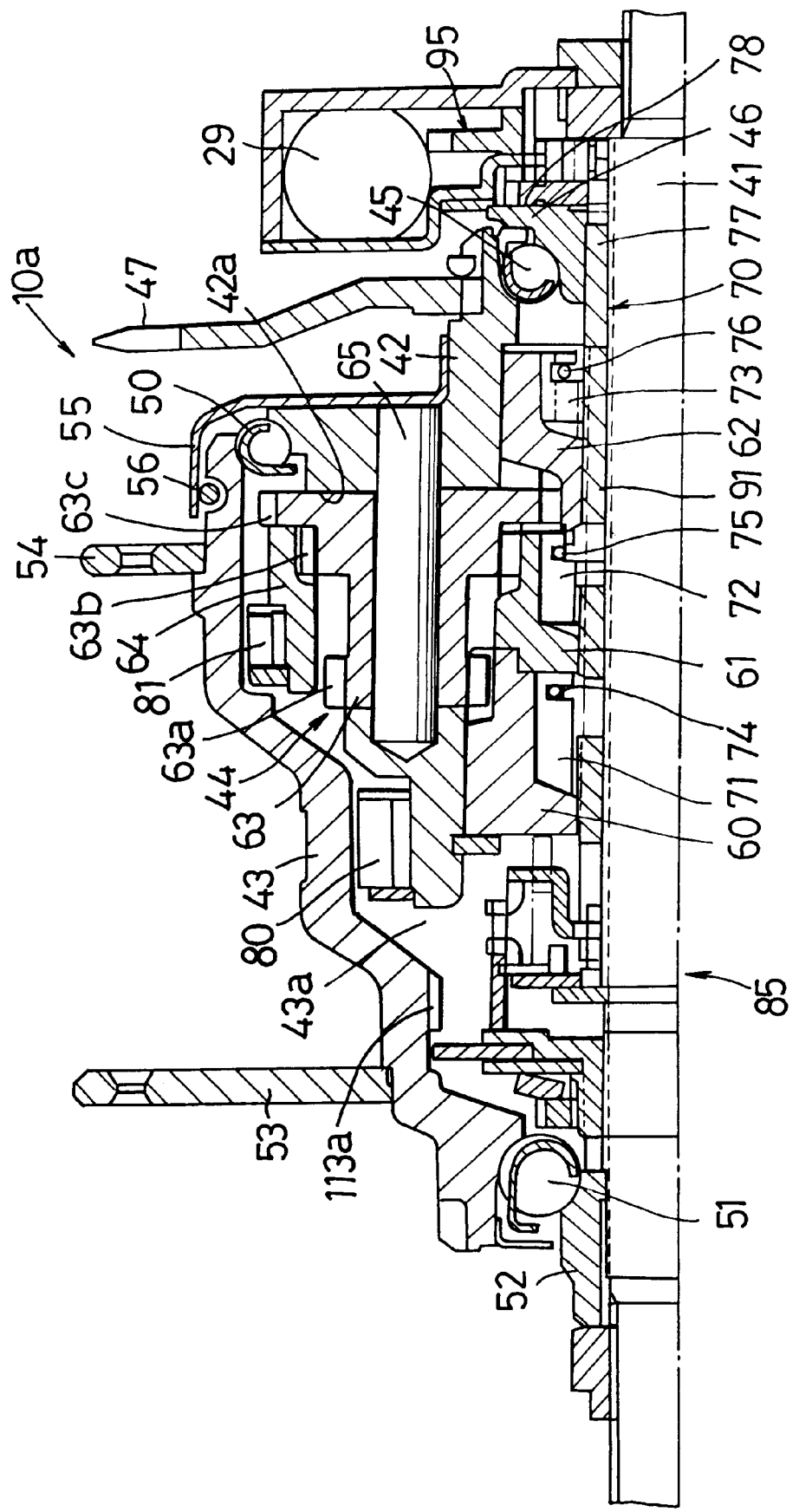
FIG. 19 is a partial cross sectional view of a bicycle hub transmission that incorporates an alternative embodiment of an antitheft device according to the present invention.

As shown in FIG. 19, an internal shifting hub 10a has an antitheft device 85 in which the sound-generating mechanism 100 in FIG. 6 is endowed with a locking function in addition to a sound-generating function. The sun gear 62 is therefore devoid of any lock pawls. Except for the presence of the antitheft device 85, this embodiment has the same structure and operation as embodiment shown in FIG. 6, and the corresponding description will therefore be omitted.

Figure 20:
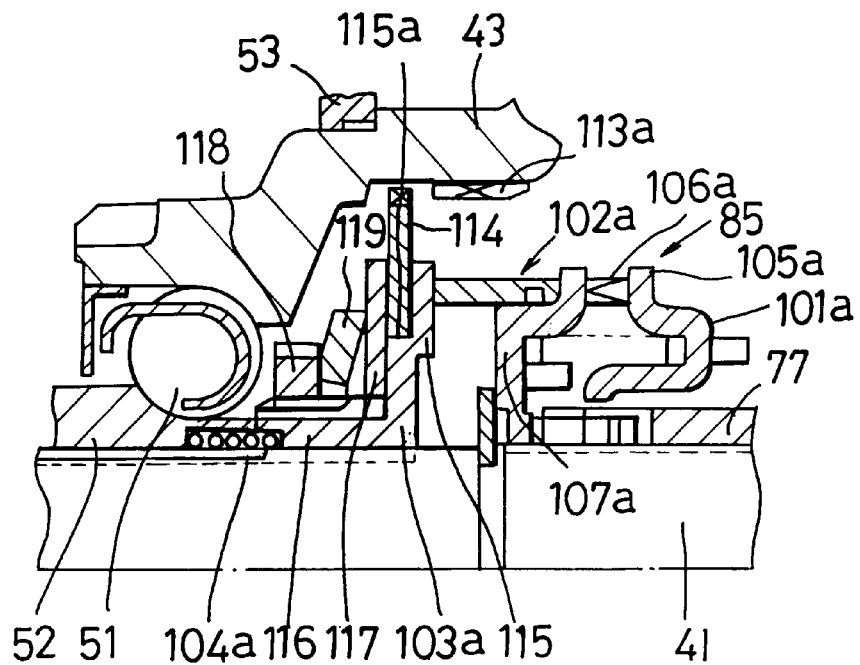
FIG. 20 is a detailed cross-sectional view of a particular embodiment of the antitheft device shown in FIG. 19 when the bicycle is in motion.
Figure 21:
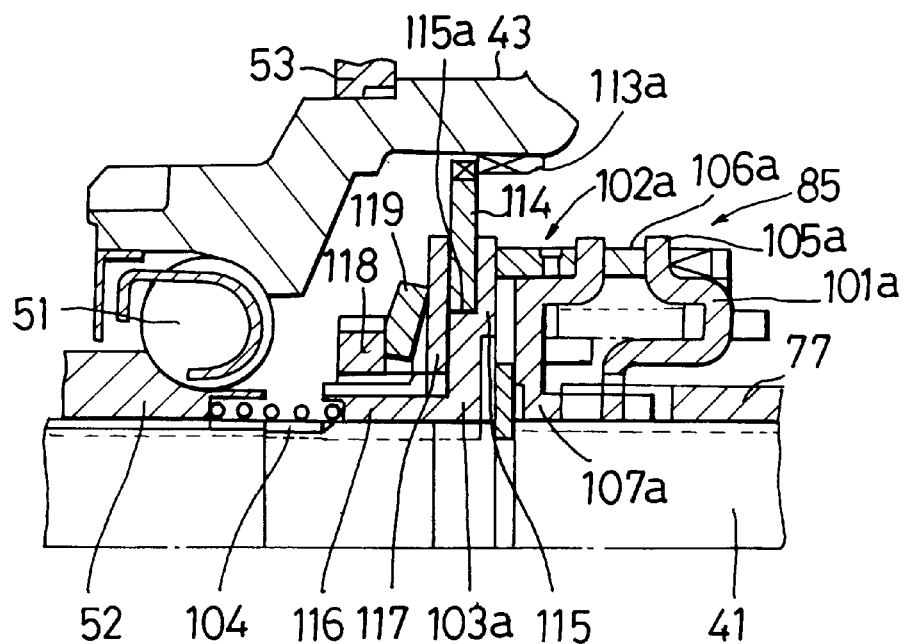
FIG. 21 is a detailed cross-sectional view of the antitheft device shown in FIG. 19 when the bicycle is in a locked state.
Figure 22A:
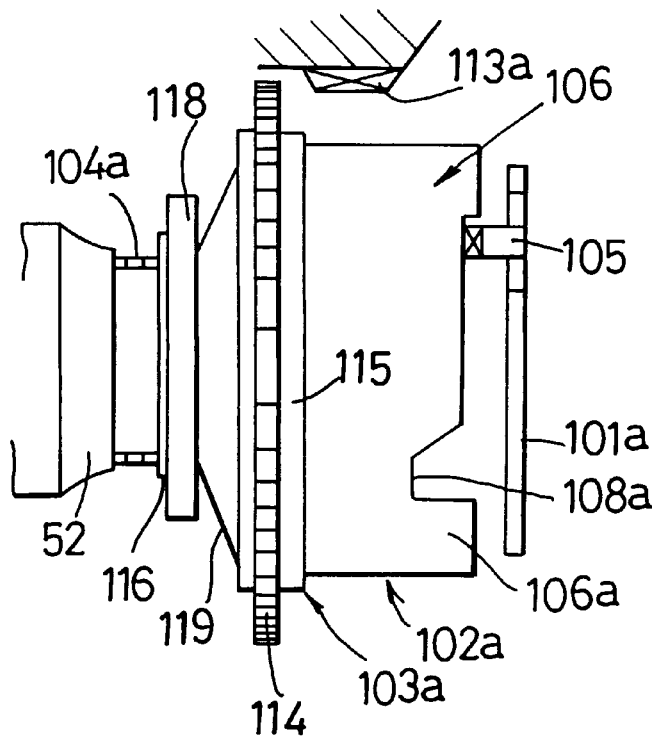
FIGS. 22(a)–22(b) are views showing the operation of the antitheft device of FIG. 19.
Figure 22B:
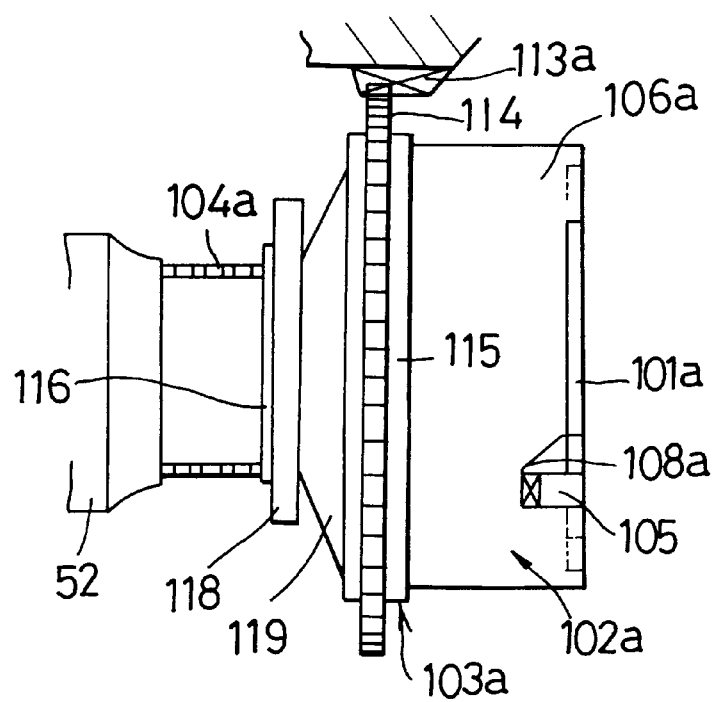

The antitheft device 85 is provided to the left end (in FIG. 19) of the hub axle 41 within the hub shell 43. As shown in FIGS. 20 through 22, the antitheft device 85 has a spring washer 101a that rotates integrally with the sleeve 77, a moving cam 102a, a moving member 103a, a moving spring 104a, and a lock ring 114. The moving cam 102a is nonrotatably installed while allowed to move axially in relation to the hub axle 41. The moving member 103a presses against the moving cam 102a, the moving spring 104a is disposed in a compressed state between the moving member 103a and a hub cone 52, and the lock ring 114 is pressed against the moving member 103a.

The spring washer 101a is a member that is nonrotatably stopped by the sleeve 77, and it has around its outer periphery an engagement tab 105a that strikes the moving cam 102a. The moving cam 102a has a cylindrical cam body 106a and a stopping washer 107a that stops the cam body 106a and the hub axle 41 such that they can move in the axial direction but cannot rotate. A cam component 108a that strikes the engagement tab 105a is formed at the right end (in FIG. 20) of the cam body 106a. The cam component 108a is formed such that the cam body 106a is moved axially to the right by the rotation of the sleeve 77 toward the locked position P.

Figure 23:
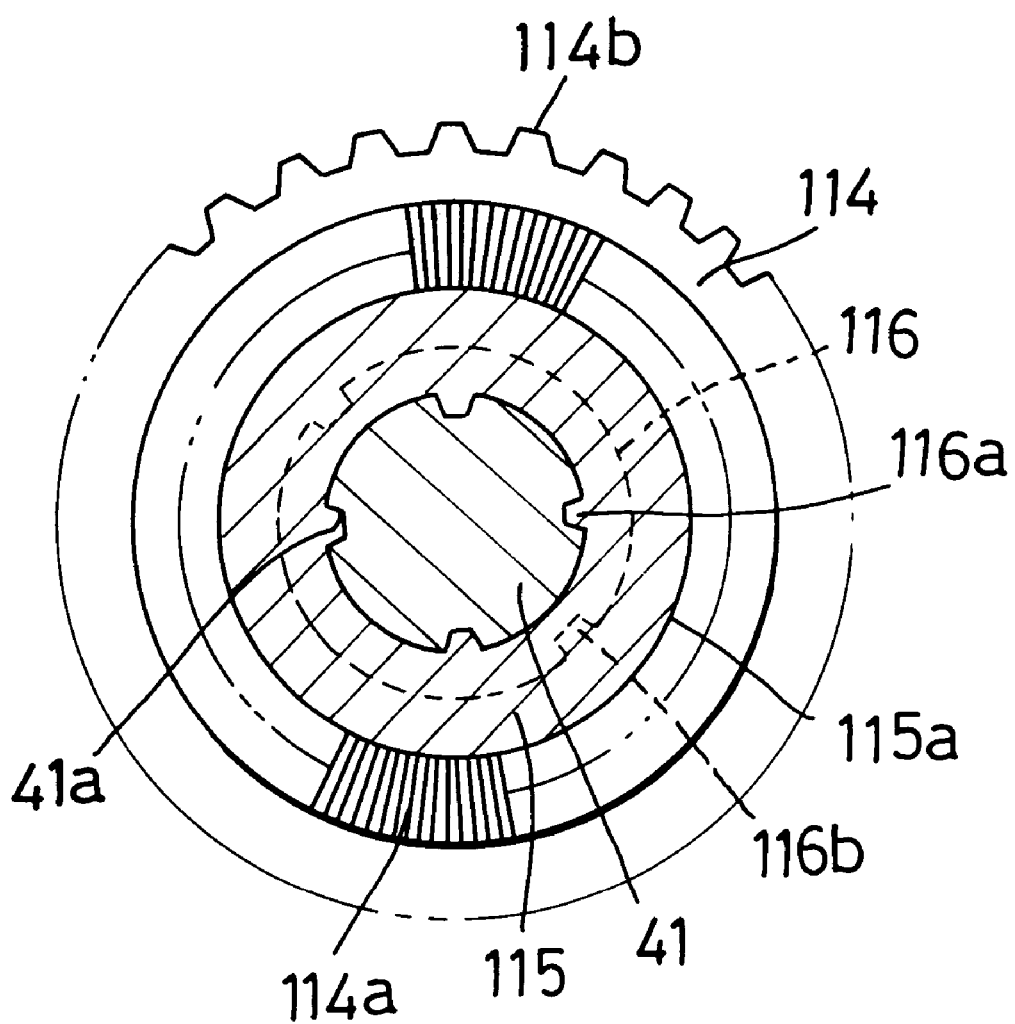
FIG. 23 is a front view of a lock ring used in the antitheft device of FIG. 19.

The moving member 103a has a disk-shaped flange component 115 and a cylindrical component 116 integrally formed along the inner periphery of the flange component 115. A step 115a is formed on the flange component 115 in its midportion as viewed in the radial direction. A lock ring 114 is rotatably supported by the step 115a. As shown in FIG. 23, respective radial irregularities 114a (only those located on the side of the lock ring 114 are shown) are formed on the surface of the flange component 115 facing the lock ring 114 and on the surface of the lock ring 114 facing the flange component 115. The presence of such irregularities 114a increases the frictional force between the lock ring 114 and the moving member 103a and causes these components to vibrate and to produce sound during relative rotation. Serration teeth 114b are formed in the outer peripheral portion of the lock ring 114, as shown in FIG. 23. These serration teeth 114b can engage with serration teeth 113a formed in the inner peripheral surface of the hub shell 43.

Four protrusions 116a are formed on the inner peripheral surface of the cylindrical component 116 as shown in FIG. 23. The protrusions 116a engage four grooves 41c formed in the outer peripheral surface of the hub axle 41. As a result of this arrangement, the moving member 103a is nonrotatably supported by the hub axle 41 while allowed to move in the axial direction. A thread and a stopping groove are formed in the outer peripheral surface of the cylindrical component 116. A pressure ring 117 is mounted around the outside of the cylindrical component 116 as shown in FIG. 20. The pressure ring 117, which is nonrotatably supported on the cylindrical component 116 while allowed to move in the axial direction, is allowed to come into contact with the lock ring 114. In addition, a pressure nut 118 is screwed on the outer periphery at the left end of the cylindrical component 116. A coned disk spring 119 is disposed between the pressure nut 118 and the pressure ring 117.

The pressure exerted by the coned disk spring 119 can be adjusted by adjusting the fastening of the pressure nut 118; the frictional force between the lock ring 114 and the flange component 115 of the moving member 103a can be adjusted via the pressure ring 117; and the rotation of the hub shell 43 can be controlled arbitrarily. For example, maximizing the frictional force produced by the coned disk spring 119 makes it possible to bring the system into a locked state with minimal rotation of the hub shell 43. Furthermore, reducing the frictional force weakens the force with which the rotation of the hub shell 43 is controlled and allows the hub shell 43 to rotate in relation to the hub axle 41. In this case as well, a frictional force is generated when the coned disk spring 119 is energized, and the rotation is controlled, unlike in a free-rotating state. This embodiment allows the rotation of the hub shell 43 (that is, the rotation of the rear wheel 7) to be freely controlled by adjusting the energizing force of the coned disk spring 119 within a range that extends essentially from the locked state to the free-rotating state.

In the antitheft device 85 thus configured, the engagement tab 105a of the spring washer 101a rotating along the sleeve 77 moves into the cam component 108a when the sleeve 77 is rotated from a shift position to the locked position P. When the engagement tab 105a moves into the cam component 108a, the moving cam 102a and the moving member 103a energized by the moving spring 104a move to the right from the position shown in FIGS. 20 and 22(A) to the position shown in FIGS. 21 and 22(B). As a result of this, the serration teeth 114b of the lock ring 114 engage with the serration teeth 113a of the hub shell 43, and the rotation of the hub shell 43 is controlled by the force of friction between the lock ring 114 and the moving member 103a. The corresponding frictional force can be altered as needed by adjusting the energizing force of the coned disk spring 119 through the tightening of the pressure nut 118. Therefore, pedaling fails to rotate the rear wheel 7 or rotates it only slightly.

At this time, an attempt to forcefully turn the hub shell 43 results in the relative rotation of the moving member 103a and the lock ring 114 and causes the lock ring 114 and the moving member 103a to vibrate and to emit a loud vibrating noise under the action of the irregularities 114a. Thus, loud noise is produced when the bicycle is pressed by hand or the pedals are pressed and the hub shell 43 is rotated in the locked state, making the bicycle more difficult to steal. Another feature is that even when the sleeve 77 is mistakenly placed in the locked position by an accidental action during riding, the rear wheel 7 is still prevented from being locked abruptly because the rotation of the rear wheel 7 is controlled by friction.

In the first embodiment described above, the sun gears are locked to prevent the bicycle from being pedaled away when the sleeve 77 is in the locked position. However, the bicycle can still be moved by pushing. By contrast, this embodiment entails directly coupling the hub shell 43 with the hub axle 41 to achieve locking. This controls the rotation of the hub shell 43 (and rear wheel 7) even when an attempt is made to push the bicycle, making it more difficult to push the bicycle and reducing the likelihood of a theft.

Figure 24:
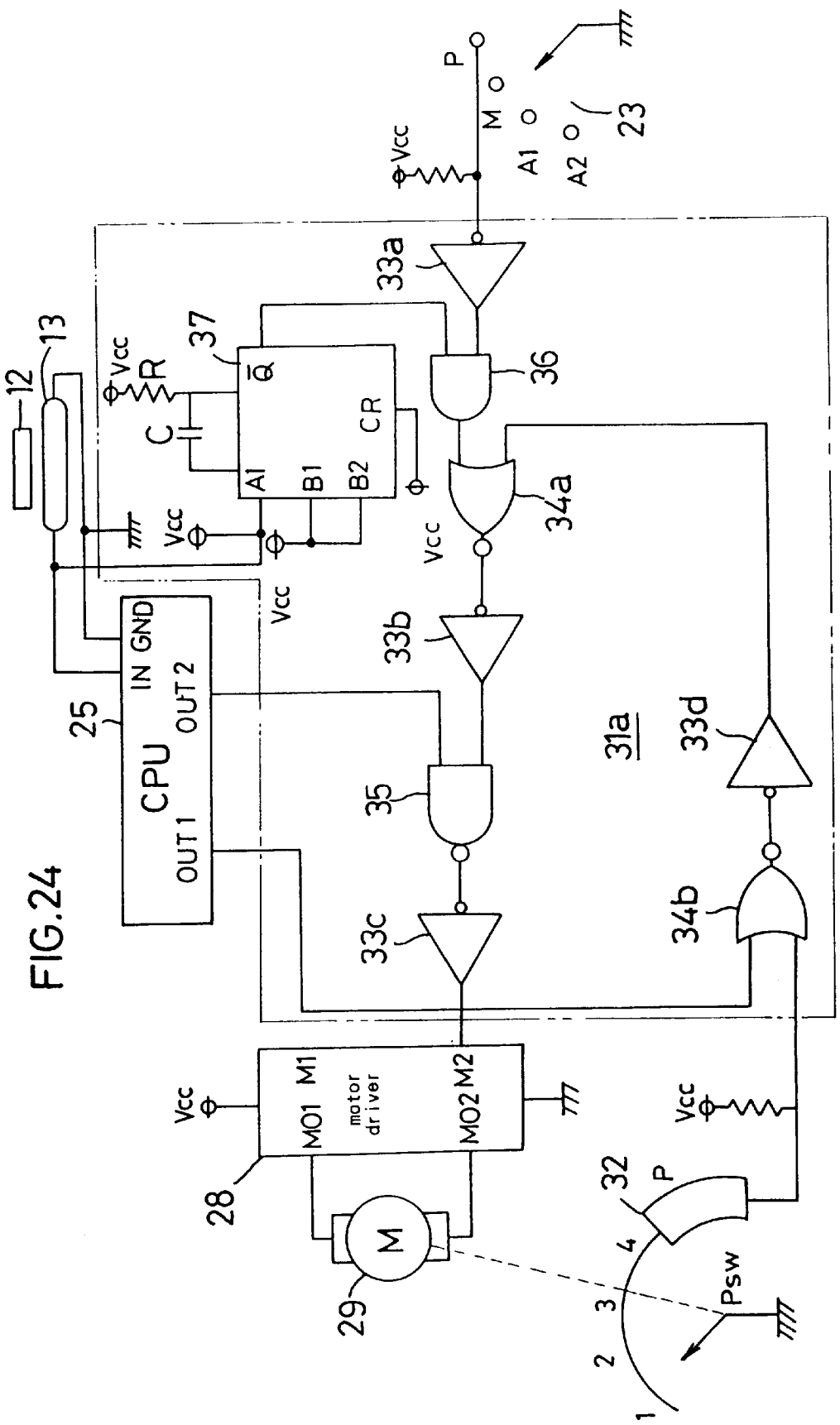
FIG. 24 is a schematic diagram of an alternative embodiment of an electrical circuit used in the motor controller according to the present invention.

In the above embodiments, the operating position unconditionally moved to the lock position when the control dial 23 was put in the park position, but in the embodiment of the motor controller shown in FIG. 24 the operating position does not move to the lock position if the control dial 23 is accidentally put in the park position during running. In FIG. 24, the structure and action of the components other than the interlock circuit 31a are the same as in the first embodiment and therefore will not be described again.

The interlock circuit 31a shown in FIG. 24 has an AND gate 36 inserted between an inverter 33a and a NOR gate 34a with respect to the interlock circuit 31 shown in FIG. 4. The output terminal of inverter 33a is connected to one of the input terminals of the AND gate 36, and the inverted output terminal bar Q of a monostable multivibrator 37 is connected to the other input terminal of AND gate 36. A bicycle speed sensor 12 is connected to the negative trigger input terminal A1 of the monostable multivibrator 37 so that a pulse-form bicycle speed signal is output from the bicycle speed sensor 12 to the negative trigger input terminal A1. A resistor R and a capacitor C are connected to the monostable multivibrator 37.

As shown in FIG. 25, with the monostable multivibrator 37, a running signal that changes to "L" when a bicycle speed signal with a period shorter than a time constant Tw is input is output from the inverted output terminal bar Q to the AND gate 36. This time constant Tw is determined by the values of the resistor R and capacitor C. For example, the values of the resistor R and capacitor C are set such that there will be a change to "L" when a speed signal of 2 kph or greater is input with a 26-inch wheel. There is a change to "H" when the wheel rotation drops and a pulse-form speed signal with a period shorter than the time constant Tw is output. Thus, the monostable multivibrator 37 outputs a running signal of "L" when the bicycle is running at 2 kph or faster.

When this running signal is input to the AND gate 36, even if the control dial 23 is turned to the park position, an "L" signal is output, and an "H" signal is input to the other input terminal of the AND gate 36 via the inverter 33a, the output of the AND gate 36 will be "L" and not "H." Accordingly, an "L" signal is input to the other input terminal of the NOR gate 34a. Also, when the operating position is in the fourth gear position, the P switch 32 is turned on and an "L" signal is input to the other input terminal as discussed above, and since the two inputs are "L," an "H" signal is output from the NOR gate 34a. Meanwhile, when the control dial 23 is turned to the park position, "L" is output from the output terminal OUT1 of the shift control component 25 and "H" is output from output terminal OUT2. As a result, an "H" signal is output from the NAND gate 35, the input terminals M1 and M2 of the motor driver 28 both become "L," and the operation of the control dial 23 during running is ignored even if it is put in the park position, so the operating position is maintained in the fourth gear position. Accordingly, running is not restricted if the control dial 23 is accidentally turned to the park position during running.

While the above is a description of various embodiments of the present invention, further modifications may be employed without departing from the spirit and scope of the present invention. For example, the size, shape, location or orientation of the various components may be changed as desired. The functions of one element may be performed by two, and vice versa.

Motor rotation prohibition and prohibition release were performed by two NOR elements in the above embodiments, but this was just an example, and any elements may be used as long as they function as logic elements. Also, the control of the internal shifter hub of a rear wheel was used as an example in the above embodiments, but the present invention is not limited to this, and can be applied to any bicycle motor control apparatus that uses a motor to switch the operating position of running components having a plurality of running permitted positions and a running restricted position. Thus, the scope of the invention should not be limited by the specific structures disclosed. Instead, the true scope of the invention should be determined by the following claims.

What is claimed is:

1. A motor control apparatus for a bicycle having a motor (29) that moves to a plurality of first positions and to a second position, the apparatus comprising:

a signal providing circuit (25) that provides a first signal (OUT1,OUT2) for commanding the motor to move from the plurality of first positions toward the second position and that provides a second signal (OUT1, OUT2) for commanding the motor (29) to move from the second position toward the plurality of first positions;

a position indicating circuit (32) for providing a position indicating signal indicating when the motor (29) is in a selected one of the plurality of first positions; and a motor inhibiting circuit (33d,34b) for providing a motor inhibiting signal for inhibiting the motor (29) from moving toward the second position in response to the first signal (OUT1,OUT2) when the position indicating signal indicates the motor (29) is in the selected one of the plurality of first positions.

2. The apparatus according to claim 1 further comprising a motor drive circuit (28) coupled to the signal providing circuit (25) and to the motor inhibiting circuit (33d,34b) for selectively driving the motor (29) in response to the first signal (OUT1,OUT2), the second signal (OUT1,OUT2), and the motor inhibiting signal.

3. The apparatus according to claim 1 wherein the position indicating circuit (32) comprises a position indicating switch (32) having:
   a plurality of first switch positions (1,2,3,4) located serially adjacent to each other and corresponding to the plurality of first positions; and
   a second switch position (P) located adjacent to the plurality of first switch positions (1,2,3,4) and corresponding to the second position.

4. The apparatus according to claim 1 wherein the motor inhibiting circuit (33d,34b) comprises a logic gate (34b) having a first input terminal for receiving the first signal (OUT1) and a second input terminal for receiving the position indicating signal.

5. The apparatus according to claim 4 wherein the logic gate (34b) comprises a NOR gate.

6. The apparatus according to claim 1 further comprising an inhibition release circuit (23,33a,34a,36) for providing an inhibition release signal for allowing the motor (29) to move toward the second position in response to the first signal (OUT1,OUT2) when the position indicating signal indicates the motor (29) is in the selected one of the plurality of first positions.

7. The apparatus according to claim 6 wherein the motor inhibiting circuit (33d,34b) and the inhibition release circuit (23,33a,34a,36) both comprise a logic circuit.

8. The apparatus according to claim 7 wherein the motor inhibiting circuit (33d, 34b) comprises a first logic gate (34b) having a first input terminal for receiving the first signal (OUT1) and a second input terminal for receiving the position indicating signal.

9. The apparatus according to claim 8 wherein the first logic gate (34b) comprises a NOR gate.

10. The apparatus according to claim 8 wherein the inhibition release circuit (23,33a,34a,36) comprises:
    a second position override circuit (23,33a) for providing a second position override signal; and
    a second logic gate (34a) having a first input terminal for receiving the motor inhibiting signal and a second input terminal for receiving the second position override signal.

11. The apparatus according to claim 10 wherein the first logic gate (34b) comprises a first NOR gate and the second logic gate (34a) comprises a second NOR gate.

12. The apparatus according to claim 10 wherein the second position override circuit (23,33a) comprises a second position override switch (23) having a plurality of serially adjacent switch positions (P,M,A1,A2), wherein a selected one of the plurality of serially adjacent switch positions (P) provides the second position override signal.

13. The apparatus according to claim 12 wherein the position indicating circuit (32) comprises a position indicating switch (32) having:
    a plurality of first switch positions (1,2,3,4) located serially adjacent to each other and corresponding to the plurality of first positions; and
    a second switch position (P) located adjacent to the plurality of first switch positions (1,2,3,4) and corresponding to the second position.

14. The apparatus according to claim 10 further comprising:
    a motion indicating circuit (12,13,37) for providing a motion indicating signal indicating whether the bicycle is in a selected motion state; and
    wherein the inhibition release circuit (23,33a,34a,36) is coupled to the motion indicating circuit (12,13,37) and provides the inhibition release signal when the motion indicating signal indicates the bicycle is in the selected motion state and the second position override signal is output from the second position override circuit (23, 33a).

15. The apparatus according to claim 14 wherein the inhibition release circuit (23,33a,34a,36) provides the inhibition release signal only when the motion indicating signal indicates the bicycle is in the selected motion state and the second position override signal is output from the second position override circuit (23,33a).

16. The apparatus according to claim 15 wherein the motion indicating circuit (12,13,37) comprises:
    a rotation sensor (12,13) for detecting rotation of a bicycle wheel; and
    a rate indicating circuit (37) coupled to the rotation sensor (12,13) for providing the motion indicating signal indicating the bicycle is in the selected state when the bicycle wheel is rotating below a selected rate.

17. The apparatus according to claim 16 wherein the rate indicating circuit (37) comprises a monostable multivibrator (37).

* * * * *